United States Patent
Song et al.

(10) Patent No.: US 9,128,930 B2
(45) Date of Patent: Sep. 8, 2015

(54) METHOD, DEVICE AND SYSTEM FOR PROVIDING LANGUAGE SERVICE

(71) Applicant: Tencent Technology (Shenzhen) Company Limited, Shenzhen (CN)

(72) Inventors: Yang Song, Shenzhen (CN); Bo Chen, Shenzhen (CN); Li Lu, Shenzhen (CN); Hao Ye, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/563,939

(22) Filed: Dec. 8, 2014

(65) Prior Publication Data

US 2015/0120277 A1    Apr. 30, 2015

Related U.S. Application Data

(63) Continuation of application No. PCT/CN2014/082908, filed on Jul. 24, 2014.

(30) Foreign Application Priority Data

Oct. 31, 2013  (CN) .......................... 2013 1 0530911

(51) Int. Cl.
| | | |
|---|---|---|
| G06F 17/28 | (2006.01) | |
| G06F 17/27 | (2006.01) | |
| G06F 17/21 | (2006.01) | |
| G10L 21/00 | (2013.01) | |
| G10L 15/26 | (2006.01) | |

(52) U.S. Cl.
CPC .............. G06F 17/289 (2013.01); G10L 15/26 (2013.01)

(58) Field of Classification Search
CPC ..... G06F 17/28; G06F 17/2854; G06F 3/167; G06F 17/20; G06F 17/2735; G06F 17/275; G06F 17/2881; G10L 15/22; G10L 15/26; G10L 21/06
USPC ............... 704/2, 3, 4, 5, 9, 10, 235, 246, 270, 704/270.1, 275, 276
See application file for complete search history.

(56) References Cited

U.S. PATENT DOCUMENTS

| | | | |
|---|---|---|---|
| 6,269,189 B1 * | 7/2001 | Chanod .......................... | 382/229 |
| 7,174,289 B2 * | 2/2007 | Sukehiro ............................ | 704/7 |
| 7,451,188 B2 * | 11/2008 | Cheung et al. ................ | 709/206 |
| 2001/0020225 A1 * | 9/2001 | Zerber ............................... | 704/3 |
| 2002/0169592 A1 * | 11/2002 | Aityan ............................... | 704/2 |
| 2004/0030781 A1 * | 2/2004 | Etesse et al. ................... | 709/225 |

(Continued)

*Primary Examiner* — Edgar Guerra-Erazo
(74) *Attorney, Agent, or Firm* — Morgan, Lewis & Bockius LLP

(57) ABSTRACT

A method, device and system for providing a language service are disclosed. In some embodiments, the method is performed at a computer system having one or more processors and memory for storing programs to be executed by the one or more processors. The method includes receiving a first message from a client device. The method includes determining if the first message is in a first language or a second language different than the first language. The method includes translating the first message into a second message in the second language if the first message is in the first language. The method includes, alternatively, generating a third message in the second language if the first message is in the second language, where the third message includes a conversational response to the first message. The method further includes returning one of the second message and the third message to the client device.

10 Claims, 11 Drawing Sheets

(56) References Cited

U.S. PATENT DOCUMENTS

| | | |
|---|---|---|
| 2004/0102957 A1* | 5/2004 | Levin .................................. 704/3 |
| 2004/0158471 A1* | 8/2004 | Davis et al. .................... 704/277 |
| 2006/0015812 A1* | 1/2006 | Cunningham et al. ......... 715/535 |
| 2006/0133585 A1* | 6/2006 | Daigle et al. ............... 379/88.06 |
| 2007/0124202 A1* | 5/2007 | Simons ............................ 705/14 |
| 2007/0143410 A1* | 6/2007 | Kraft et al. ..................... 709/206 |
| 2007/0276814 A1* | 11/2007 | Williams ........................... 707/3 |
| 2008/0126077 A1* | 5/2008 | Thorn ............................... 704/8 |
| 2008/0177528 A1* | 7/2008 | Drewes ............................. 704/2 |
| 2008/0281577 A1* | 11/2008 | Suzuki ............................. 704/2 |
| 2010/0204981 A1* | 8/2010 | Ribeiro et al. .................... 704/8 |
| 2010/0293230 A1* | 11/2010 | Lai et al. ........................ 709/206 |
| 2011/0077934 A1* | 3/2011 | Kanevsky et al. ................ 704/3 |

* cited by examiner

METHOD, DEVICE AND SYSTEM FOR PROVIDING LANGUAGE SERVICE

RELATED APPLICATIONS

This application is a continuation application of PCT Patent Application No. PCT/CN2014/082908, entitled "METHOD, DEVICE AND SYSTEM FOR PROVIDING LANGUAGE SERVICE" filed on Jul. 24, 2014, which claims priority to Chinese Patent Application Serial No. 201310530911.0, entitled "METHOD, DEVICE AND SYSTEM FOR PROVIDING LANGUAGE SERVICE", filed on Oct. 31, 2013, both of which are incorporated herein by reference in their entirety.

TECHNICAL FIELD

The present application generally relates to the field of computer technology, and more particularly to a method and related device and system for providing a language service.

BACKGROUND

With the popularity of foreign language learning, more and more application programs are generated to provide language-related functions such as speech recognition, language translation and language learning. Those application programs can operate on user terminals such as phones, tablets, e-readers, computers, etc.

Some known language translation services can translate a textual message in a native language into a textual or speech message in a foreign language. Such language translation services, however, typically receive and translate textual messages in the native language in a sentence-by-sentence fashion. As a result, those known language translation services typically do not provide continuous speech dialog practices, causing low efficiency in learning the foreign language.

Thus, a need exists for a method, device and system that can provide a language service that enables continuous speech dialog practice and provides high efficiency in learning foreign languages.

SUMMARY

The above deficiencies associated with the known password-retrieving method may be reduced or eliminated by the techniques described herein.

In some embodiments, a method for providing a language service is performed at a computer system having one or more processors and memory for storing programs to be executed by the one or more processors. The method includes receiving a first message from a client device, and then determining if the first message is in a first language or a second language different than the first language. The method includes translating the first message into a second message in the second language if the first message is in the first language. The method includes generating a third message in the second language if the first message is in the second language, where the third message includes a conversational response to the first message. The method further includes returning one of the second message and the third message to the client device.

In some embodiments, a server device includes one or more processors and memory storing one or more programs for execution by the one or more processors. The one or more programs include instructions that cause the server device to perform a method for providing a language service as follows. The server device receives an indication of an operational mode from a client device, where the operational mode is a conversation mode or a translation mode. The server device then receives a first message from the client device, and determines if the first message is in a first language or a second language different than the first language. If the first message is in the second language and the operational mode is the conversation mode, the server device generates a second message in the second language, where the second message includes a conversational response to the first message. If the first message is in the second language and the operational mode is the translation mode, the server device translates the first message into a third message in the first language. Subsequently, the service device returns one of the second message and the third message to the client device if the first message is in the second language.

In some embodiments, a non-transitory computer readable storage medium stores one or more programs including instructions for execution by one or more processors. The instructions, when executed by the one or more processors, cause the processors to perform a method for providing a language service as follows. The method includes receiving a first message from a client device. The method includes determining that the first message includes a first portion in a first language and a second portion in a second language different than the first language. The method also includes translating the first message into a second message in the second language. The method further includes returning the second message to the client device.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
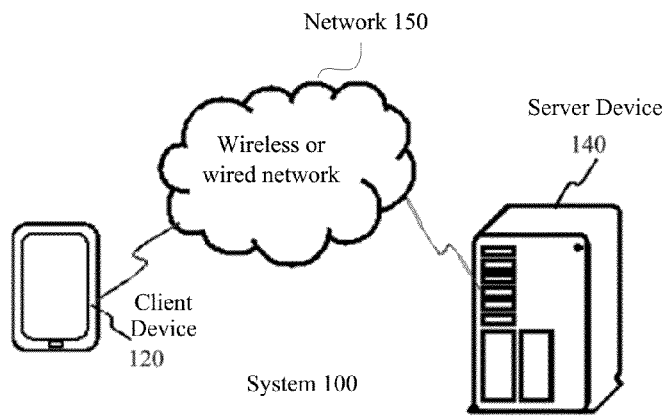
FIG. 1 is a schematic diagram illustrating a system configured to provide a language service in accordance with some embodiments.

FIG. 1 is a schematic diagram illustrating a system 100 configured to provide a language service in accordance with some embodiments. As shown in FIG. 1, the system 100 includes a server device 145 and a client device 125. The server device 145 is operatively coupled to and communicates with the client device 125 via a network 155. Although not shown in FIG. 1, the client device 125 can be accessed and operated by one or more users. The server device 145 and the client device 125 of the system 100 are configured to collectively provide one or more language services to the user(s) operating the client device 125.

Although shown in FIG. 1 as including a single server device and a single client device, in other embodiments, a system configured to provide language services can include any number of server devices and/or any number of client devices. Each server device included in such a system can be identical or similar to the server device 145, and each client device included in such a system can be identical or similar to the client device 125. For example, multiple client devices can be operatively coupled to and communicate with a server device to receive a language service related to English and Chinese. For another example, a client device can be operatively coupled to and communicate with a first server device to receive a language service related to English and French, and a second server device to receive another language service related to English and Spanish.

The network 155 can be any type of network configured to operatively couple one or more server devices (e.g., the server device 145) to one or more client devices (e.g., the client device 125), and enable communications between the server device(s) and the client device(s). In some embodiments, the network 155 can include one or more networks such as, for example, a cellular network, a satellite network, a local area network (LAN), a wide area network (WAN), a wireless local area network (WLAN), etc. In some embodiments, the network 155 can include the Internet. Furthermore, the network 155 can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

The server device 145 can be any type of device configured to function as a server-side device of the system 100. Specifically, the server device 145 is configured to communicate with one or more client devices (e.g., the client device 125) via the network 155, and provide language service(s) to user(s) of the client device(s). In some embodiments, the server device 145 can be, for example, a background server, a back end server, a database server, a workstation, a desktop computer, a cloud computing server, a data processing server, and/or the like. In some embodiments, the server device 145 can be a server cluster or server center consisting of two or more servers (e.g., a data processing server and a database server).

The client device 125 can be any type of electronic device configured to function as a client-side device of the system 100. Specifically, the client device 125 is configured to communicate with one or more server device(s) (e.g., the server device 145) via the network 155, and interact with one or more users operating the client device 125 to provide the language service(s) to the user(s). In some embodiments, the client device 125 can be, for example, a cellular phone, a smart phone, a mobile Internet device (MID), a personal digital assistant (PDA), a tablet computer, an e-book reader, a laptop computer, a handheld computer, a desktop computer, a wearable device, a MP3 player (Moving Picture Experts Group Audio Layer III), a MP4 (Moving Picture Experts Group Audio Layer IV) player, and/or any other personal electronic device. In some embodiments, a client device can also be, for example, a mobile device, a user device, a terminal, a portable device, and/or the like.

Additionally, a user operating the client device 125 can be any person (potentially) interested in receiving the language service(s) provided by the system 100. Such a person can be, for example, an instructor for a foreign language, a researcher on languages, a translator, a writer, an editor, a reader, a student, etc. Particularly, the user can be a self-learner who speaks a native language and is interested in learning a foreign language. As shown and described below with respect to FIGS. 2-10, the system 100 (including the server device 145 and the client device 125) is configured to provide one or more language services to the user(s) operating the client device 125.

Figure 2:
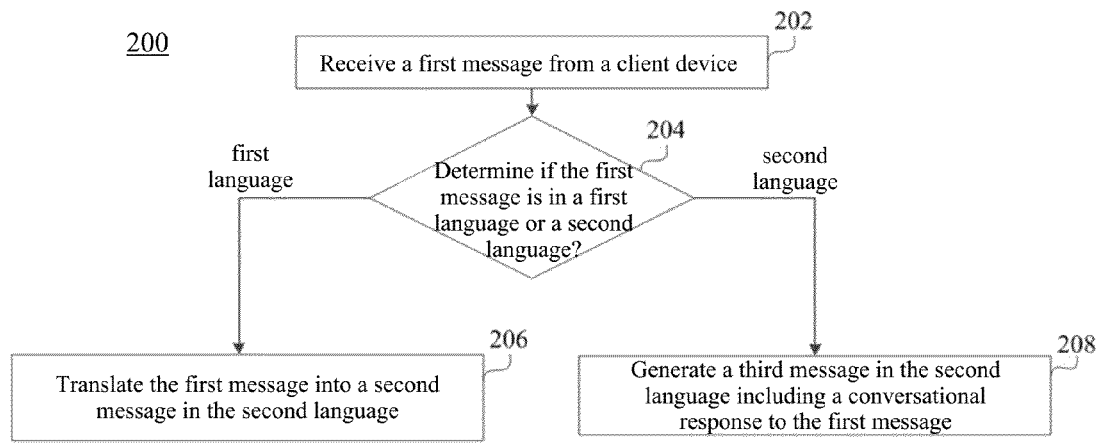
FIG. 2 is a flowchart illustrating a method performed at a server device for providing a language service in accordance with some embodiments.

FIG. 2 is a flowchart illustrating a method 200 performed at a server device for providing a language service in accordance with some embodiments. The server device performing the method 200 can be structurally and functionally similar to the server device 145 shown and described above with respect to FIG. 1. Particularly, the server device can include one or more processors and memory. Furthermore, the server device is configured to be operatively coupled to (e.g., via a network similar to the network 155 in FIG. 1) and communicate with one or more client devices (e.g., the client device 125 in FIG. 1).

In some embodiments, the method 200 is governed by instructions or code of an application that are stored in a non-transitory computer readable storage medium of the server device and executed by the one or more processors of the server device. In such embodiments, the application is associated with providing a language service, and has a server-side portion that is stored in and/or executed at the server device, and a client-side portion that is stored in and/or executed at the client device(s) communicating with the server device. As a result of such an application being executed, the method 200 is performed to provide the language service to a user of a client device communicating with the server device. As shown in FIG. 2, the method 200 includes the following steps.

At 202, the server device receives a first message from the client device. The first message can be any type of message entered into the client device by the user. In some embodiments, the first message can be a textual message entered by the user using a suitable input method associated with the client device such as, for example, a keyboard, a mouse, a touch pen, a touch screen, and/or the like. The textual message can be limited with a maximum length such as, for example, 30 words (e.g., in English, French, Spanish or any other suitable language), 100 letters (e.g., in English, French, Spanish or any other suitable language), 150 characters with or without spaces (e.g., in Chinese, English or any other suitable language), etc. In some other embodiments, the first message can be a speech message entered by the user using a suitable input method associated with the client device such as, for example, a microphone, an audio input module, a circuitry, and/or the like. Similarly to the textual message, the speech message can be limited with a maximum length (e.g., in time) such as, for example, 1 minute, 30 seconds, etc.

The first message can be in any style such as, for example, a conversational style (e.g., a question, an interrogative clause, an inquiry, a response, etc.), a narrative style (e.g., a declarative sentence, a descriptive paragraph, etc.), and/or the like. The first message can be in any language (e.g., English, Chinese, Spanish, etc.) associated with the application, or in a mixture of more than one language. A method for handling a message in a mixture of two languages is shown and described below with respect to FIG. 4A.

At 204, the server device determines if the first message is in a first language or a second language. The first language and the second language are associated with the language service provided by the application. The first language is a language identified by the user as a basis for the user to learn other languages (e.g., the second language). In some embodiments, the first language can be a native language (also known as a mother tongue, an arterial language, etc.) of the user, a language the user speaks (masters, grasps, etc.), or a language in which the user has relatively more knowledge and skills. On the other hand, the second language is a language identified by the user as a target for the user to learn (e.g., based on the first language). The second language is different from the first language. In some embodiments, the second language can be a foreign language of the user, a language the user does not master or speak, or a language in which the user has relatively less knowledge and skills. For example, a native Chinese-speaker interested in learning English can identify Chinese as her first language and English as her second language. For another example, a native English-speaker that speaks French can identify French as her first language and Spanish as her second language.

Additionally, in some embodiments, the first language and the second language can be predefined as a default setting for the application. In such embodiments, the user can optionally change the first language and/or the second language by modifying the default setting prior to and/or during her use of the application. In some other embodiments, the user can define the first language and the second language prior to her use of the application. In any embodiment described herein with respect to FIG. 2, the first language and the second language are defined for the application prior to the method 200 being performed.

The server device can use any suitable method in determining the language of the first message. In some embodiments, if the first message is a speech message, the server device can use, for example, an acoustic model associated with the first language and an acoustic model associated with the second language to determine the language of the first message. In some embodiments, the acoustic models for the first language and the second language can be stored in, for example, a memory (e.g., a database) of the server device. The determination operations described below can be executed at, for example, a data processing unit (e.g., a processor) of the server device.

Specifically, the server device can calculate a first confidence value for the first message based on the acoustic model associated with the first language. Similarly, the server device can calculate a second confidence value for the first message based on the acoustic model associated with the second language. Each of those acoustic models is built based on training data associated with the corresponding language. After the first message in input into the acoustic model associated with the first language, a series of phoneme frames of the first message are detected by that acoustic model, and a confidence value associated with each phoneme frame is generated. The first confidence value (e.g., an overall confidence value for the first message based on that acoustic model) can then be calculated based on the confidence values of the series of phoneme frames (e.g., as an average). The second confidence value (e.g., an overall confidence value for the first message based on the acoustic model for the second language) can also be obtained in a similar way.

The server device can then compare the first confidence value with the second confidence value, and determine if the first message is in the first language or the second language based on the comparison result. For example, the server device can determine that the first message is in the first language if the first confidence value is higher than (or not lower than) the second confidence value, and in the second language otherwise. In other embodiments, the server device can use any other suitable speech-recognition and/or language identification method to determine the language for the first message when the first message is a speech message.

In some embodiments, if the first message is a textual message, the server device can use, for example, a regular expression of the first message and/or encoding information of the first message to determine the language of the first message. Specifically, upon receiving the first message, the server device can generate a regular expression of the first message. The server device can then compare the regular expression of the first message with, for example, a regular expression template for the first language and a regular expression template for the second language, respectively. The server device can further make a determination on the language of the first message based on the comparison result. For example, the server device can determine that the first message is in the first language if the regular expression of the first message is closer (e.g., structurally, grammatically, formatively, substantively, etc.) to the regular expression template for the first language than to the regular expression template for the second language, and that the first message is in the second language otherwise.

Alternatively, the server device can retrieve encoding information of the first message. The server device can then compare the encoding information of the first message with, for example, an encoding model for the first language and an encoding model for the second language, respectively. The server device can further make a determination on the language of the first message based on the comparison result. For example, the server device can determine that the first message is in the first language if the encoding information of the first message is closer (e.g., structurally, grammatically, formatively, substantively, etc.) to the encoding model for the first language than to the encoding model for the second language, and that the first message is in the second language otherwise.

For example, in encoding language information, each character of the first language (e.g., Chinese) occupies two units (e.g., two bytes), while each character of the second language (e.g., English) occupies one unit (e.g., one byte). As such, a difference between encoding information of the first language and that of the second language can be detected.

Additionally, the regular expression templates and/or the encoding models for the first language and the second language can be stored in, for example, a memory (e.g., a database) of the server device. The determination operations described above can be executed at, for example, a data processing unit (e.g., a processor) of the server device. In other embodiments, the server device can use any other suitable textual determination and/or language identification method to determine the language for the first message when the first message is a textual message.

If the server device determines that the first message is in the first language, at 206, the server device translates the first message into a second message in the second language. Each of the first message and the second message can be in any suitable form such as, for example, a speech message or a textual message. In some embodiments, the second message can be a combination of, for example, a textual message and a speech message, each of which is a translation of the first message. In other words, the same translation of the first message can be represented in two different forms, speech and text, by the second message. In some embodiments, the service device can generate the second message as a speech message, a textual message, or a combination of both by default. In some embodiments, the user can optionally define the type of the second message prior to and/or during the performing of the method 200.

The first message can be translated into the second message using any suitable translation technique and/or message-transforming technique, depending on the type of the first message and the second message. For example, if the first message is a textual message and the second message is a textual message too, the server device can translate the first message into the second message using a machine translation technique associated with translating the first language into the second language.

For another example, if the first message is a textual message and the second message is a speech message, the server device can first translate the first message into a textual message in the second language using a machine translation technique associated with translating the first language into the second language. The server device can then generate the second message based on the translated textual message using a speech synthesis technique associated with the second language. That is, the second message is a text-to-speech transform of the translated textual message.

For yet another example, if the first message is a speech message and the second message is a speech message too, the server device can first generate a textual message in the first language based on the first message using a speech recognition system for the first language. That is, the textual message in the first language is a speech-to-text transform of the first message. The server device can then translate the textual message in the first language into a textual message in the second language using a machine translation technique associated with translating the first language into the second language. Lastly, the server device can generate the second message based on the textual message in the second language using a speech synthesis technique associated with the second language. That is, the second message is a text-to-speech transform of the textual message in the second language.

Otherwise, if the server device determines that the first message is in the second language, at 208, the server device generates a third message in the second language that includes a conversational response to the first message. Similar to the second message, the third message can be in any suitable form such as, for example, a speech message or a textual message. In some embodiments, the third message can be a combination of a textual message and a speech message, each of which includes an identical conversational response to the first message. In other words, the same conversational response to the first message can be represented in two different forms, speech and text, by the third message. In some embodiments, the service device can generate the third message as a speech message, a textual message, or a combination of both by default. In some embodiments, the user can optionally define the type of the third message prior to and/or during the performing of the method 200.

The conversational response to the first message can be generated at the server device using any suitable conversation technique and/or message-transforming technique, depending on the type of the first message and the third message. For example, if the first message is a textual message and the third message is a textual message too, the server device can generate, in the second language, a conversational response to the first message using a man-machine interrogation technique. The server device can then generate the third message to include the conversational response in a textual form.

For another example, if the first message is a textual message and the third message is a speech message, the server device can first generate, in the second language, a conversational response to the first message using a man-machine interrogation technique. The server device can then generate a textual message in the second language to include the conversational response. Lastly, the server device can generate the third message based on the textual message using a speech synthesis technique associated with the second language. That is, the third message is a text-to-speech transform of the textual message.

For yet another example, if the first message is a speech message and the third message is a speech message too, the server device can first generate a textual message in the second language based on the first message using a speech recognition system for the second language. That is, the textual message is a speech-to-text transform of the first message. The server device can then generate, in the second language, a conversational response to the textual message using a man-machine interrogation technique. Next, the server device can generate a responding textual message in the second language to include the conversational response. Lastly, the server device can generate the third message based on the responding textual message using a speech synthesis technique associated with the second language. That is, the third message is a text-to-speech transform of the responding textual message.

After the server device generates the second message or the third message, the server device can send the generated message (the second message or the third message) to the client device such that the generated message is output to the user. If the generated message includes a textual message, the textual message can be presented on a display of the client device such as, for example, a monitor, a screen, a touch screen, etc.

If the generated message includes a speech message, the speech message can be played using, for example, a speaker of the client device.

Figure 3:
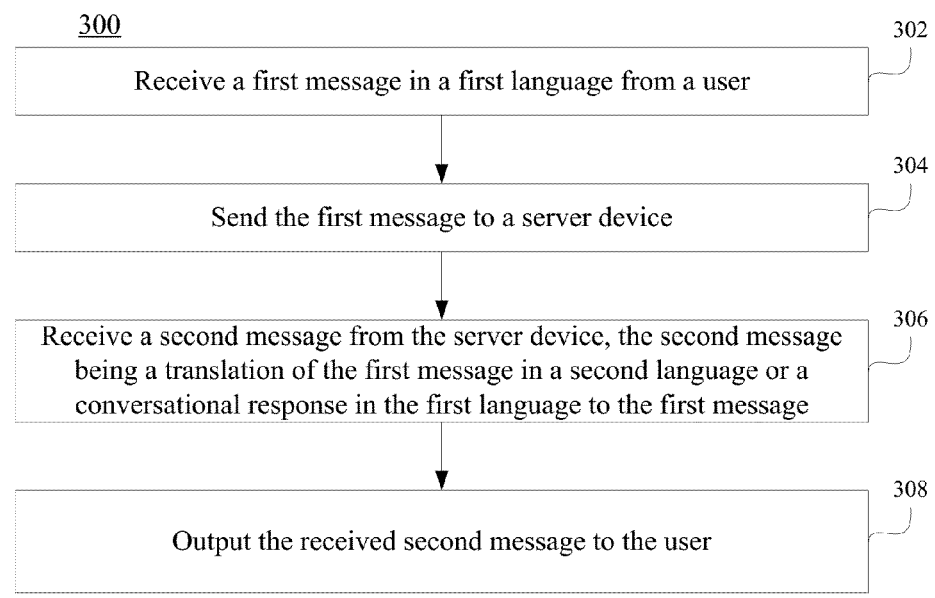
FIG. 3 is a flowchart illustrating a method performed at a client device for providing a language service in accordance with some embodiments.

FIG. 3 is a flowchart illustrating a method 300 performed at a client device for providing a language service in accordance with some embodiments. The client device performing the method 300 can be structurally and functionally similar to the client device 125 shown and described above with respect to FIG. 1. Particularly, the client device can include one or more processors and memory. Furthermore, the client device is configured to be operatively coupled to (e.g., via a network similar to the network 155 in FIG. 1) and communicate with a server device (e.g., the server device 145 in FIG. 1).

In some embodiments, the method 300 is associated with the application for providing the language service to a user of the client device, which is described above with respect to FIG. 2. In such embodiments, the application has a server-side portion stored in and/or executed at the server device performing the method 200 in FIG. 2, and a client-side portion stored in and/or executed at the client device performing the method 300. Moreover, the method 300 is governed by instructions or code of the client-side portion of the application that are stored in a non-transitory computer readable storage medium of the client device and executed by the one or more processors of the client device. As shown in FIG. 3, the method 300 includes the following steps.

At 302, the client device receives a first message in a first language from the user. As described above with respect to Step 202 of the method 200, the first message can be in any suitable form (e.g., a speech message, a textual message, etc.) and can be entered by the user using any suitable input method (e.g., a keyboard, a mouse, a touch pen, a touch screen, a microphone, etc.).

In response to receiving the first message, at 304, the client device sends the first message to the server device. As described above with respect to Steps 204-208 of the method 200, the first message is processed at the server device, and a responding message (e.g., the second message or the third message in the method 200) is generated at and then sent from the server device to the client device.

As a result, at 306, the client device receives a second message from the server device. Note that the second message with respect to the method 300 is not necessarily the second message described above with respect to the method 200. Similarly, the first language (or the second language) with respect to the method 300 is not necessarily the first language (or the second language) described above with respect to the method 300.

As described above with respect to Steps 206-208 of the method 200, the second message can be a translation of the first message in a second language (i.e., corresponding to the translated message generated at Step 206 in the method 200, which is a translation of the initial message received from the client device at Step 202 in the method 200), or a conversational response in the first language to the first message (i.e., corresponding to the responding message generated at Step 208 in the method 200, which is a conversational response to the initial message received from the client device at Step 202 in the method 200). Furthermore, as described above with respect to the method 200, the second message can be in any suitable form such as, for example, a speech message, a textual message, a combination of a speech message and a textual message, etc.

In response to receiving the second message from the server device, at 308, the client device outputs the received second message to the user. As described above with respect to the method 200, the second message can be output by the client device to the user using any suitable output method based on the form of the second message. For example, if the second message includes a textual message, that textual message can be presented on a display (e.g., a monitor, a screen, a touch screen, etc.) of the client device. For another example, if the second message includes a speech message, that speech message can be played using an audio output device (e.g., a speaker) of the client device.

Figure 4A:
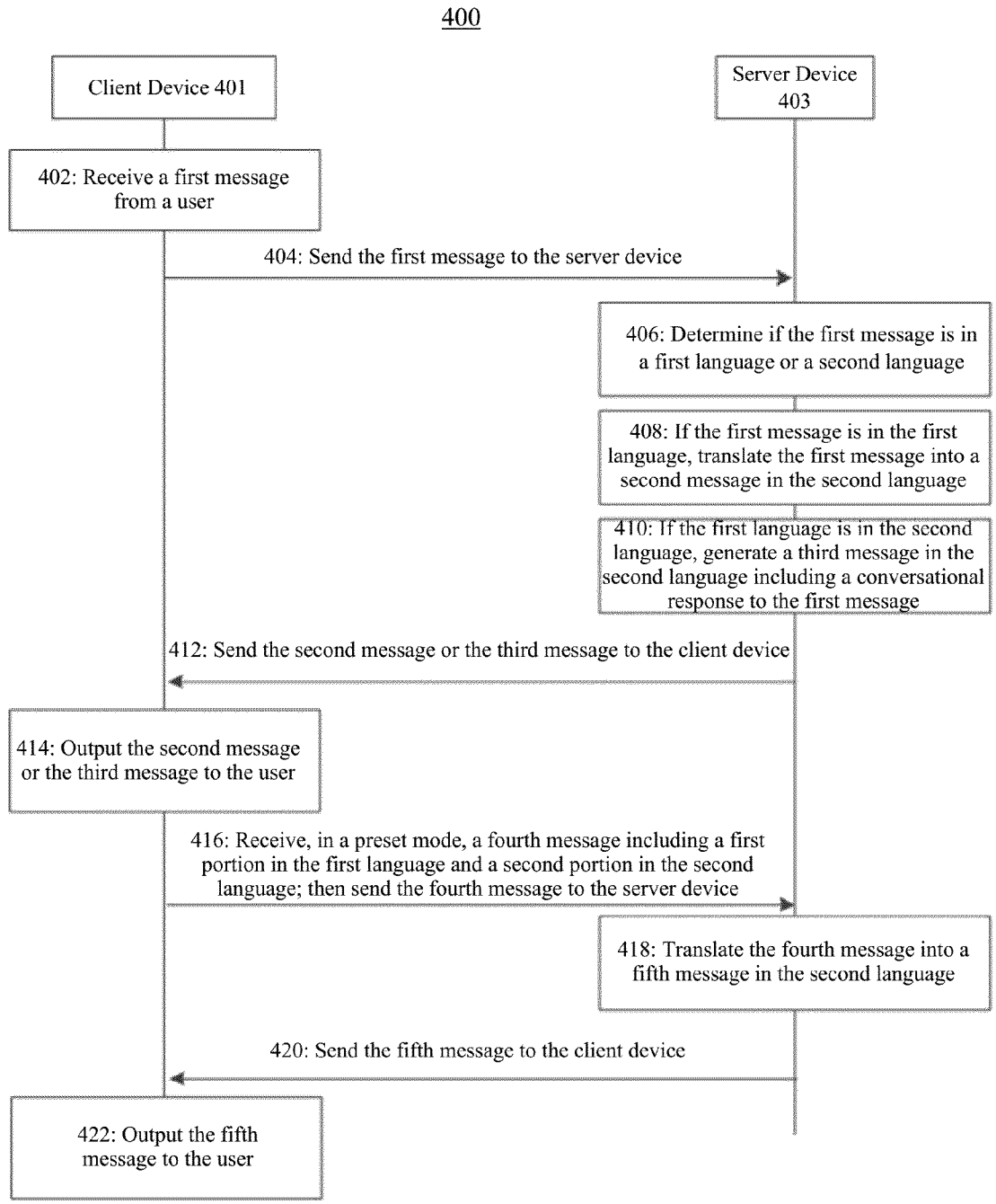
FIG. 4A is a flowchart illustrating a method performed at a client device and a server device for providing a language service in accordance with some embodiments.

FIG. 4A is a flowchart illustrating a method 400 performed at a client device 401 and a server device 403 for providing a language service in accordance with some embodiments. FIGS. 4B-4G are schematic diagrams illustrating user interfaces of the client device 401 associated with the method 400 in FIG. 4A. Although shown in FIGS. 4B-4G as a smart phone, in other embodiments, the client device 401 can be any type of electronic device configured to communicate with the server device 403 for providing the language service to user(s) of the client device 401.

The client device 401 can be structurally and functionally similar to the client devices shown and described above with respect to FIGS. 1-3. The server device 403 can be structurally and functionally similar to the server devices shown and described above with respect to FIGS. 1-3. Particularly, each of the client device 401 and the server device 403 can include one or more processors and memory. Furthermore, the client device 401 is configured to be operatively coupled to (e.g., via a network similar to the network 155 in FIG. 1, not shown in FIG. 4A) and communicate with the server device 403.

In some embodiments, the method 400 is governed by instructions or code of an application that are stored in non-transitory computer readable storage mediums of the client device 401 and the server device 403, and executed by the processors of the client device 401 and the server device 403. In such embodiments, the application is associated with providing a language service to a user of the client device 401 (not shown in FIG. 4A), and similar to the application described above with respect to the methods 200, 300 in FIGS. 2-3. Specifically, the application has a client-side portion that is stored in and/or executed at the client device 401, and a server-side portion that is stored in and/or executed at the server device 403. As a result of such an application being executed collectively at the client device 401 and the server device 403, the method 400 is performed to provide the language service to the user of the client device 401. As shown in FIG. 4A, the method 400 includes the following steps.

At 402, the client device 401 receives a first message from the user. As described above with respect to Step 202 of the method 200 and Step 302 of the method 300, the first message can be in any suitable form (e.g., a speech message, a textual message, etc.) and can be entered by the user using any suitable input method (e.g., a keyboard, a mouse, a touch pen, a touch screen, a microphone, etc.).

Figure 4B:
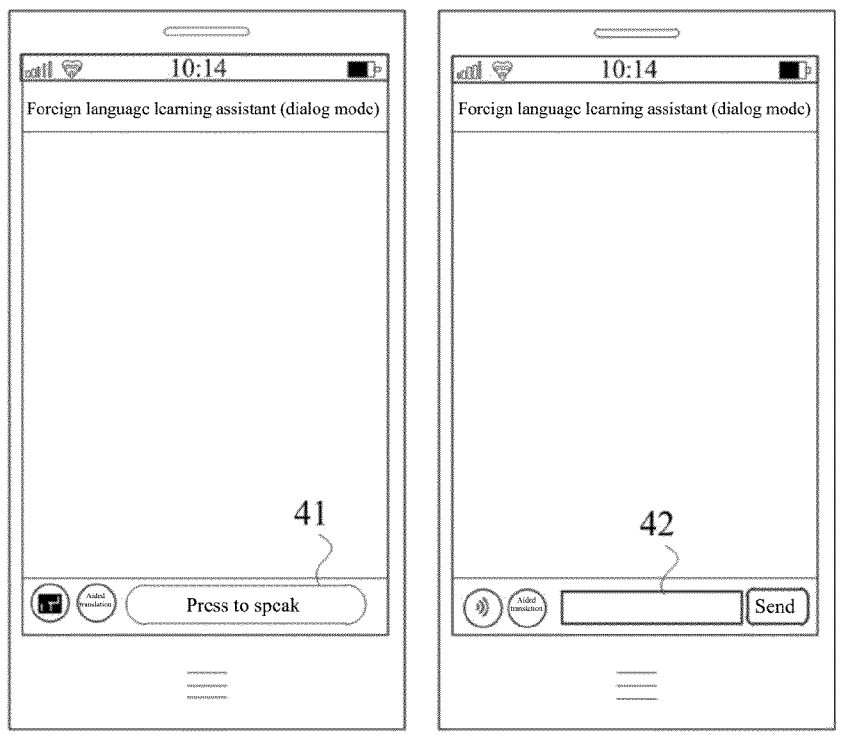
FIGS. 4B-4G are schematic diagrams illustrating user interfaces of the client device associated with the method in FIG. 4A.

For example, as shown in the left user interface in FIG. 4B, the user can enter a speech message by pressing a button 41 ("Press to speak") on the user interface and then speaking to a microphone of the client device 401. The message spoken by the user to the microphone of the client device 401 is then recorded and transformed into a speech message at the client device 401. For another example, as shown in the right user interface in FIG. 4B, the user can enter a textual message by typing texts into a text entry box 42 on the user interface and then clicking the "Send" button on the user interface of the client device 401. The texts typed into the text entry box 42 are then captured and transformed into a textual message at the client device 401.

In response to receiving the first message, at 404, the client device 401 sends the first message to the server device 403.

Upon receiving the first message from the client device 401, at 406, the server device 403 determines if the first message is in a first language or a second language. As described above with respect to Step 204 of the method 200, the server device 403 can determine the language of the first message using any suitable speech recognition method, textual determination method, language identification method, and/or the like. The determination can be based on any data or information of the first message and/or other resources such as, for example, an acoustic model associated with the first language or the second language, a regular expression of the first message, encoding information of the first message, a regular expression template of the first language or the second language, an encoding model for the first language or the second language, etc.

If the server device 403 determines that the first message is in the first language, at 408, the server device 403 translates the first message into a second message in the second language. The second message can be in any suitable form such as, for example, a textual message, a speech message, a combination of a textual message and a speech message, etc. As described above with respect to Step 206 of the method 200, the server device 403 can translate the first message into the second message using any suitable translation technique and/or message-transforming technique (e.g., a machine translation technique, a speech synthesis technique, a text-to-speech transform technique, etc.) based on the forms of the first message and the second message.

Otherwise, if the server device 403 determines that the first message is in the second language, at 410, the server device 403 generates a third message in the second language including a conversational response to the first message. The third message can be in any suitable form such as, for example, a textual message, a speech message, a combination of a textual message and a speech message, etc. As described above with respect to Step 208 of the method 200, the server device 403 can generate the third message using any suitable conversation technique and/or message-transforming technique (e.g., a man-machine interrogation technique, a speech synthesis technique, a text-to-speech transform technique, a speech-to-text transform technique, etc.) based on the forms of the first message and the third message.

In some embodiments, upon determining the language of the first message, the server device 403 can recognize the content of the first message. Subsequently, the server device 403 can optionally send a signal back to the client device 401 causing the client device 401 to output the first message, such that the user can confirm the accuracy of the interpretation of the first message by the server device 403. Particularly, if the first message is a speech message, the server device 403 can send, to the client device 401, a signal including a textual message corresponding to the first message (i.e., as a speech-to-text transform of the first message). As a result, the client device 401 can present the textual message on a display of the client device 401.

Figure 4C:
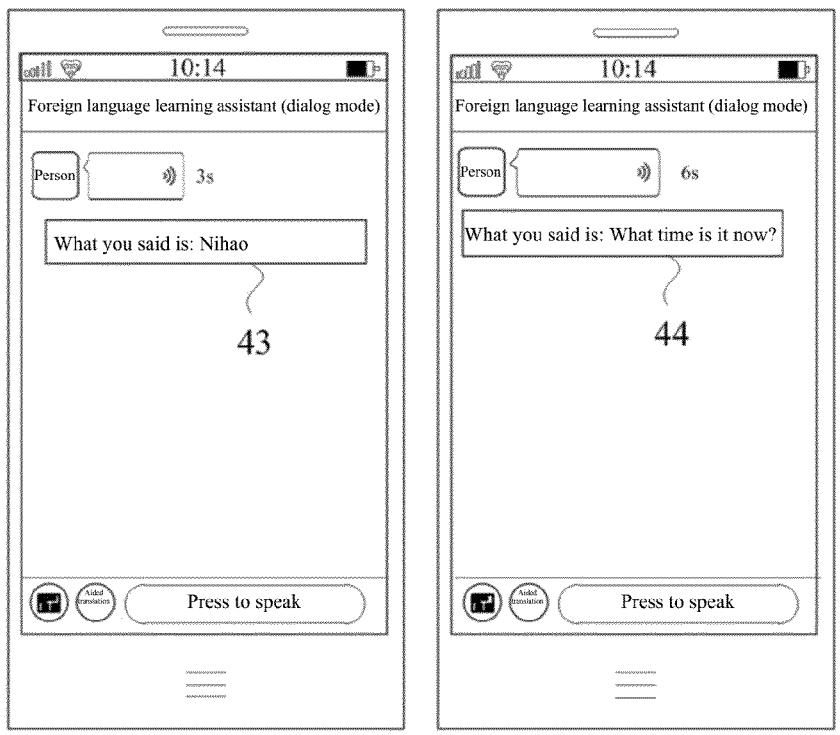

For example, as shown in the left user interface in FIG. 4C, the user enters a speech message in Chinese of 3 seconds. In response, the client device 401 displays a textual message 43 indicating that the speech message entered by the user is "Nihao" ("hello" in Chinese). For another example, as shown in the right user interface in FIG. 4C, the user enters a speech message in English of 6 seconds. In response, the client device 401 displays a textual message 44 indicating that the speech message entered by the user is "what time is it now".

After generating the second message or the third message, at 412, the server device 403 sends the second message or the third message to the client device 401. In response to receiving the second message or the third message, at 414, the client device 401 outputs the received second message or third message to the user. As described above with respect to Step 308 of the method 300, the client device 401 can output the received message to the user using any suitable output method based on the form of the received message.

Figure 4D:
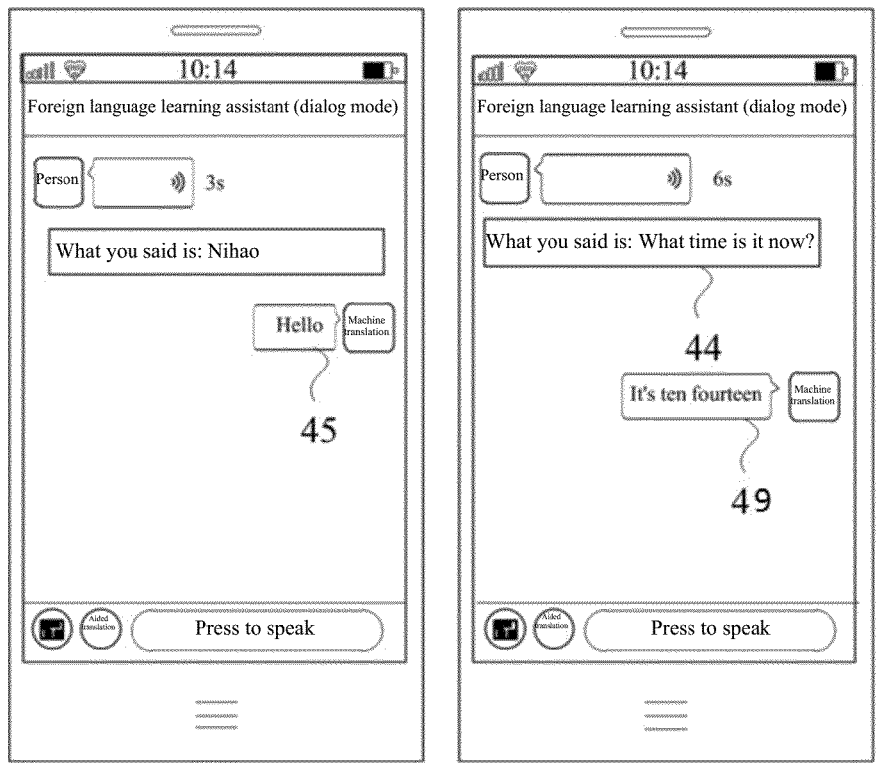

For example, if the received message includes a textual message, that textual message can be presented on a display (e.g., a monitor, a screen, a touch screen, etc.) of the client device 401. FIG. 4D illustrates such an example. As shown in the left user interface in FIG. 4D, the user enters a speech message in Chinese of 3 seconds. The client device 401 first displays a first textual message indicating that the speech message entered by the user is "Nihao" ("hello" in Chinese). The client device 401 then displays a second textual message 45 ("Hello"), which is a response (a translation or a conversational response) to the speech message generated at and sent from the server device 403. Similarly, as shown in the right user interface in FIG. 4D, the user enters a speech message in English of 6 seconds. The client device 401 first displays a first textual message 44 indicating that the speech message entered by the user is "what time is it now". The client device 401 then displays a second textual message 49 ("It's ten fourteen"), which is a conversational response to the speech message generated at and sent from the server device 403.

For another example, if the received message includes a speech message, that speech message can be played using an audio output device (e.g., a speaker) of the client device 401. For yet another example, if the received message includes both a textual message and a corresponding speech message, the speech message can be played using an audio output device of the client device 401, while the textual message being presented on a display of the client device 401 at (substantially) the same time.

At 416, the client device 401 receives, in a preset mode, a fourth message including a first portion in the first language and a second portion in the second language. The client device 401 then sends the fourth message to the server device 403. The fourth message can be a textual message or a speech message. In some embodiments, such a preset mode can be defined to indicate that a message received under the preset mode can be a message solely in the first language, a message solely in the second language, or a mixed message in both the first language and the second language. In other words, a message (e.g., a textual message, a speech message) entered by the user under the preset mode can optionally include a first portion in the first language and a second portion in the second language.

Figure 4E:
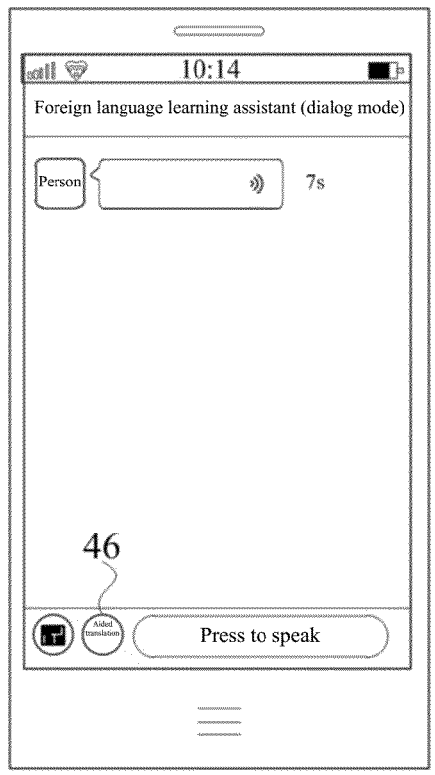

In some embodiments, such a preset mode can be activated by, for example, an operation performed on a user interface of the client device 401. For example, as shown in FIG. 4E, the user activates the preset mode by clicking an aided-translation button 46 on a user interface of the client device 401. Under the preset mode, the user enters a speech message of 7 seconds, which is mixed in two languages (e.g., Chinese and English), by pressing the "press to speak" button and then speaking to a microphone of the client device 401. Additionally, the user can deactivate the preset mode by, for example, clicking the aided-translation button 46 again. Similarly, although not shown in the figures, the user can enter a mixed textual message by activating the preset mode (e.g., by clicking the aided-translation button 46), and then typing texts mixed in the two language into a text entry box (e.g., the text entry box 42 in FIG. 4B) on the user interface of the client device 401.

After receiving the fourth message, at 418, the server device 403 translates the fourth message into a fifth message in the second language. The fifth message can be in any suitable form such as, for example, a textual message, a speech message, a combination of a textual message and a speech message, etc. First, the server device 403 determines that the fourth message is a mixed message in the two languages by using any suitable bilingual recognition technique. For example, if the fourth message is a textual message, the server device 403 can determine the language(s) of the fourth message by using a suitable bilingual text recognition technique (e.g., based on a regular expression or encoding information of the fourth message, applying regular express templates and/or encoding models of the two languages). For another example, if the fourth message is a speech message, the server device 403 can determine the language(s) of the fourth message by using a suitable bilingual speech recognition technique (e.g., applying acoustic models for the two languages, and/or an acoustic model for a mixture of the two languages). Moreover, the server device 403 determines the first portion (which is in the first language) and the second portion (which is in the second language), respectively. Specifically, the server device 403 can determine one or more boundaries between the first portion and the second portion of the fourth message.

Next, the server device 403 recognizes the content of the fourth message. In some embodiments, as described above with respect to the first message, the serer device 403 can optionally send a signal back to the client device 401 causing the client device 401 to output the fourth message, such that the user can confirm the accuracy of the interpretation of the fourth message by the server device 403. Particularly, if the fourth message is a speech message, the server device 403 can send, to the client device 401, a signal including a textual message corresponding to the fourth message (i.e., as a speech-to-text transform of the fourth message). As a result, the client device 401 can present the textual message on a display of the client device 401.

Figure 4F:
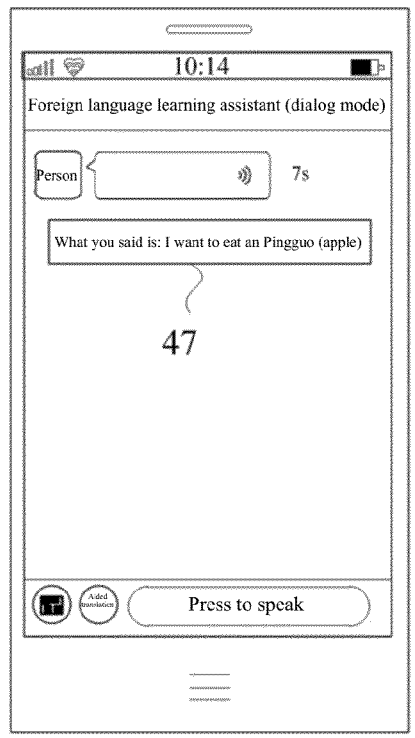

For example, as shown in FIG. 4F, the user enters a speech message of 7 seconds under the preset mode. The speech message is a mixture in English and Chinese. In response, the client device 401 displays a textual message 47 indicating that the speech message entered by the user is "I want to eat an Pingguo (apple)" ("Pingguo" means "apple" in Chinese).

Subsequently, the server device 403 translates the fourth message into the fifth message in the second language. Similar to the second message, the fifth message can be a speech message, a textual message, or a combination of a speech message and a textual message. The server device 403 can translate the fourth message into the fifth message using any suitable translation technique and/or message-transforming technique (e.g., a machine translation technique, a speech synthesis technique, a text-to-speech transform technique, etc.) based on the forms of the fourth message and the fifth message, and the determination of the first portion and the second portion of the fourth message. In some embodiments, for example, the server device 403 can translate the first portion in the first language into a corresponding portion in the second language by using a suitable machine translation technique. The server device 403 can then combine the corresponding translated portion with the second portion to generate the fifth message in a suitable method.

After generating the fifth message, at 420, the server device 403 sends the fifth message to the client device 401. In response to receiving the fifth message, at 422, the client device 401 outputs the fifth message to the user. As described above with respect to Step 308 of the method 300, the client device 401 can output the fifth message to the user using any suitable output method based on the form of the fifth message.

Figure 4G:
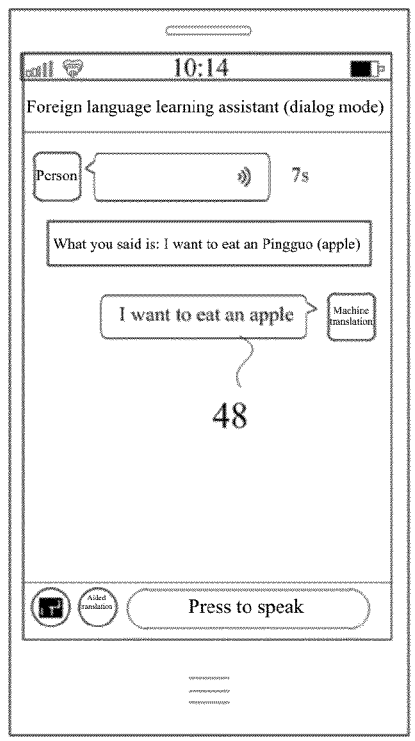

For example, if the fifth message includes a textual message, that textual message can be presented on a display (e.g., a monitor, a screen, a touch screen, etc.) of the client device 401. FIG. 4G illustrates such an example. As shown in FIG. 4G, the user enters a mixed speech message in English and Chinese. The client device 401 first displays a first textual message in a mixture of English and Chinese, which indicates that the mixed speech message entered by the user is "I want to eat an Pingguo (apple)" ("Pingguo" means "apple" in Chinese). The client device 401 then displays a second textual message 48 ("I want to eat an apple") in English, which is a translation of the mixed speech message in English. The second textual message 48 is generated at and sent from the server device 403.

For another example, if the fifth message includes a speech message, that speech message can be played using an audio output device (e.g., a speaker) of the client device 401. For yet another example, if the fifth message includes both a textual message and a corresponding speech message, the speech message can be played using an audio output device of the client device 401, while the textual message being presented on a display of the client device 401 at (substantially) the same time.

In some embodiments, although not shown in the figures, the server device 403 can generate a message in the second language (e.g., a textual message, a speech message) including a conversational response to the fourth message, and then send that message to the client device 401. Such a conversational response can be similar to the third message described above with respect to the method 400. Similar to the third message, such a conversational response can be output at the client device 401 (e.g., along with or separately from the fifth message).

Figure 5A:
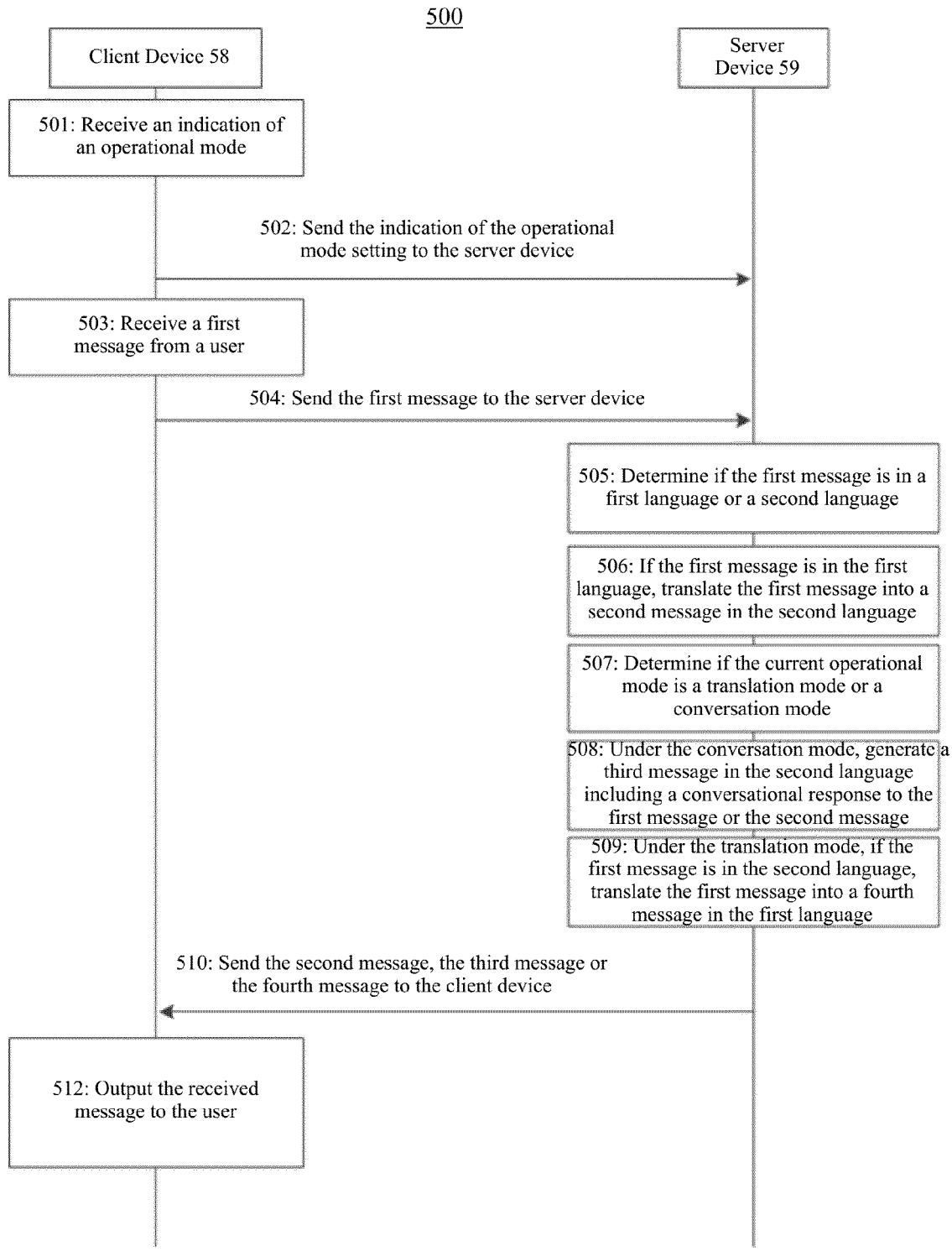
FIG. 5A is a flowchart illustrating a method performed at a client device and a server device for providing another language service in accordance with some embodiments.
Figure 5B:
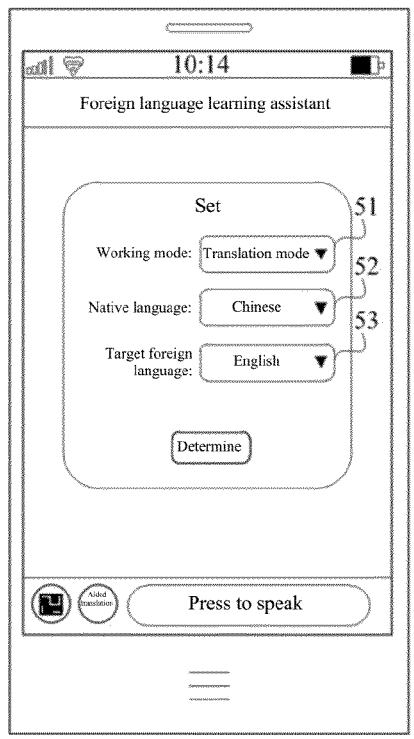
FIGS. 5B-5D are schematic diagrams illustrating user interfaces of the client device associated with the method in FIG. 5A.
Figure 5C:
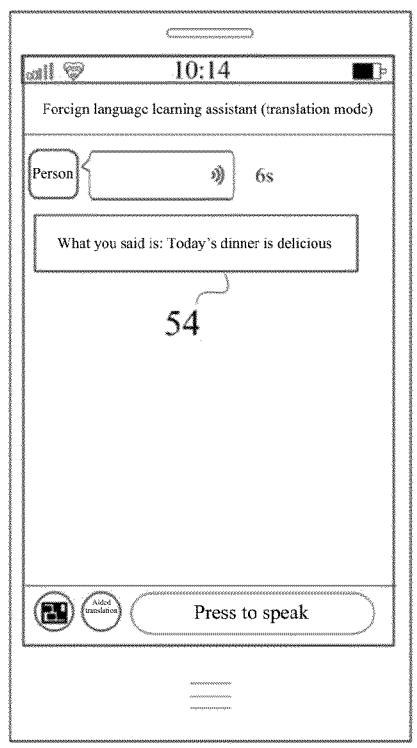
Figure 5D:
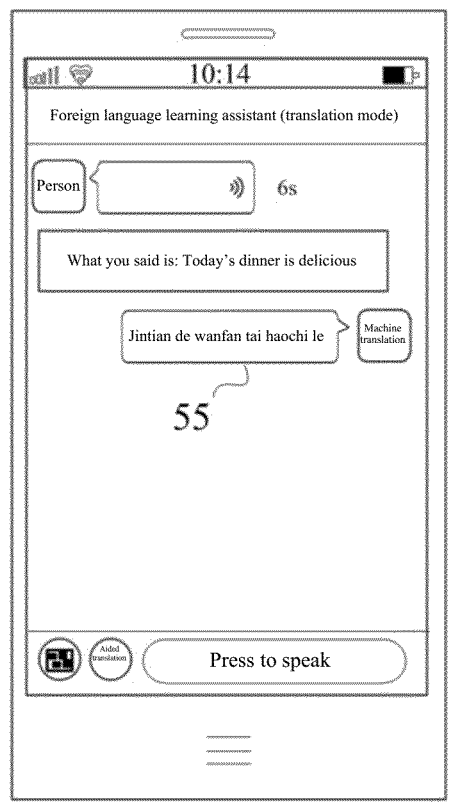

FIG. 5A is a flowchart illustrating a method 500 performed at a client device 58 and a server device 59 for providing another language service in accordance with some embodiments. FIGS. 5B-5D are schematic diagrams illustrating user interfaces of the client device 58 associated with the method 500 in FIG. 5A. Although shown in FIGS. 5B-5D as a smart phone, in other embodiments, the client device 58 can be any type of electronic device configured to communicate with the server device 59 for providing the language service to user(s) of the client device 58.

The client device 58 can be structurally and functionally similar to the client devices shown and described above with respect to FIGS. 1-4G. The server device 59 can be structurally and functionally similar to the server devices shown and described above with respect to FIGS. 1-4G. Particularly, each of the client device 58 and the server device 59 can include one or more processors and memory. Furthermore, the client device 58 is configured to be operatively coupled to (e.g., via a network similar to the network 155 in FIG. 1, not shown in FIG. 5A) and communicate with the server device 59.

In some embodiments, the method 500 is governed by instructions or code of an application that are stored in non-transitory computer readable storage mediums of the client device 58 and the server device 59, and executed by the processors of the client device 58 and the server device 59. In such embodiments, the application is associated with providing a language service to a user of the client device 58 (not shown in FIG. 5A), and similar to the application described above with respect to the methods 200, 300, 400 in FIGS. 2-4A. Specifically, the application has a client-side portion that is stored in and/or executed at the client device 58, and a server-side portion that is stored in and/or executed at the server device 59. As a result of such an application being executed collectively at the client device 58 and the server device 59, the method 500 is performed to provide the language service to the user of the client device 58. As shown in FIG. 5A, the method 500 includes the following steps.

At 501, the client device 58 receives an indication of an operational mode. Such an operational mode can be selected by the user from multiple operational modes. In some embodiments, the user can select the operational mode from, for example, a translation mode and a conversation mode. Furthermore, in some embodiments, the user can configure a setting associated with the selected operational mode. In some embodiments, the user can select, from multiple languages, a first language (or a native language, a mother language) and a second language (or a foreign language, a target language) for the selected operational mode (e.g., the translation mode, the conversation mode). In some embodiments, an operational mode can also be referred to as a working mode, an operating mode, and/or the like. In some embodiments, the user can select the operational mode and/or determine other configuration settings using any suitable methods. In response to receiving the indication of the operational mode, at 502, the client device 58 sends the indication of the selected operational mode and/or the other determined configuration settings to the server device 59.

For example, as shown in FIG. 5B, a user interface of the client device 58 displays a configuration environment, which prompts the user to select a working mode, a native language, and a target foreign language. As shown in FIG. 5B, the user selects "translation mode" as the working mode from multiple working mode candidates using a dropdown menu 51. The user also selects "Chinese" as the native language using a dropdown menu 52 and selects "English" as the target foreign language using a dropdown menu 53. The user can then submit her selections by clicking the "Determine" button in the user interface. As a result, the configuration settings selected by the user can be stored at the client device 58 and also sent to the server device 59. Accordingly, the client device 58 and the server device 59 can execute the instructions or code of the application associated with the selected working mode, with the selected native language and the selected target foreign language set as input to the application.

At 503, the client device 58 receives a first message from the user. At 504, the client device 58 sends the first message to the server device 59. Similar to the first messages shown and described above with respect to the methods 200, 300, 400 in FIGS. 2-4A, the first message can be in any suitable form (e.g., a speech message, a textual message, etc.) and can be entered by the user using any suitable input method (e.g., a keyboard, a mouse, a touch pen, a touch screen, a microphone, etc.).

After receiving the first message, at 505, the server device 59 determines if the first message is in a first language or a second language. As described above with respect to the methods 200 and 400 in FIGS. 2 and 4A, the server device 59 can determine the language of the first message using any suitable speech recognition method, textual determination method, language identification method, and/or the like. The determination can be based on any data or information of the first message and/or other resources such as, for example, an acoustic model associated with the first language or the second language, a regular expression of the first message, encoding information of the first message, a regular expression template of the first language or the second language, an encoding model for the first language or the second language, etc.

In some embodiments, upon determining the language of the first message, the server device 59 can recognize the content of the first message, and optionally, send a signal back to the client device 58 causing the client device 58 to output the first message. Particularly, if the first message is a speech message, the server device 59 can send, to the client device 58, a signal including a textual message corresponding to the first message (i.e., as a speech-to-text transform of the first message). As a result, the client device 58 can present the textual message on a display of the client device 58. For example, as shown in FIG. 5C, the user enters a speech message in English of 6 seconds. In response, the client device 58 displays a textual message 54 indicating that the speech message entered by the user is "Today's dinner is delicious".

If the server device 59 determines that the first message is in the first language, at 506, the server device 59 translates the first message into a second message in the second language. The second message can be in any suitable form such as, for example, a textual message, a speech message, a combination of a textual message and a speech message, etc. As described above with respect to the methods 200 400 in FIGS. 2 and 4A, the server device 59 can translate the first message into the second message using any suitable translation technique and/or message-transforming technique (e.g., a machine translation technique, a speech synthesis technique, a text-to-speech transform technique, etc.) based on the forms of the first message and the second message.

At 507, the server device 59 determines if the current operational mode is the translation mode or the conversation mode. Specifically, the server device 59 makes such a determination based on the indication of the operational mode sent from the client device 58 at 502.

If the server device 59 determines that the current operational mode is the conversation mode, at 508, the server device 59 generates a third message in the second language including a conversational response to the first message or the second message. The third message can be in any suitable form such as, for example, a textual message, a speech message, a combination of a textual message and a speech message, etc. Specifically, if the first message is in the first language, the second message is generated at 506 as a translation in the second language for the first message. Thus, the server device 59 generates the third message as a conversational response to the second message. As such, the third message is an indirect conversational response to the first message (i.e., connected by the second message). Otherwise, if the first message is in the second language, the server device 59 generates the third message as a direct conversational response to the first message.

As described above with respect to the methods 200, 400 in FIGS. 2 and 4A, the server device 59 can generate the third message using any suitable conversation technique and/or message-transforming technique (e.g., a man-machine interrogation technique, a speech synthesis technique, a text-to-speech transform technique, a speech-to-text transform technique, etc.) based on the form of the third message, and the form of the first message or the second message.

Otherwise, if the server device 59 determines that the current operational mode is the translation mode and the first message is in the second language, at 509, the server device 59 translates the first message into a fourth message in the first language. The fourth message can be in any suitable form such as, for example, a textual message, a speech message, a combination of a textual message and a speech message, etc. As described above with respect to the methods 200, 400 in FIGS. 2 and 4A, the server device 59 can translate the first message into the fourth message using any suitable translation technique and/or message-transforming technique (e.g., a machine translation technique, a speech synthesis technique, a text-to-speech transform technique, etc.) based on the forms of the first message and the fourth message. Additionally, note that if the current operational mode is the translation mode and the first message is in the first language, the server device 59 translates the first message into the second message in the second language, at 506.

After generating a responding message (e.g., the second message, the third message, or the fourth message), at 510, the server device 59 sends the responding message to the client device 58. In response to receiving the responding message, at 512, the client device 58 outputs the received responding message to the user. As described above with respect to the methods 300, 400 in FIGS. 3 and 4A, the client device 58 can output the received responding message to the user using any suitable output method based on the form of the received responding message.

For example, if the received responding message is a translation of the first message (e.g., the second message or the fourth message) including a textual message, that textual message can be presented on a display (e.g., a monitor, a screen, a touch screen, etc.) of the client device 58. FIG. 5D illustrates such an example. As shown in FIG. 5D, the user enters a speech message in English. The client device 58 first displays a first textual message indicating that the speech message entered by the user is "Today's dinner is delicious". The client device 58 then displays a second textual message 55 ("Jintian de wanfan tai haochi le"), which is a translation of the first textual message in Chinese (pinyin). The second textual message is generated at and sent from the server device 59.

For another example, if the received responding message includes a speech message, that speech message can be played using an audio output device (e.g., a speaker) of the client device 58. For yet another example, if the received responding message includes both a textual message and a corresponding speech message, the speech message can be played using an audio output device of the client device 58, while the textual message being presented on a display of the client device 58 at (substantially) the same time.

Figure 6:
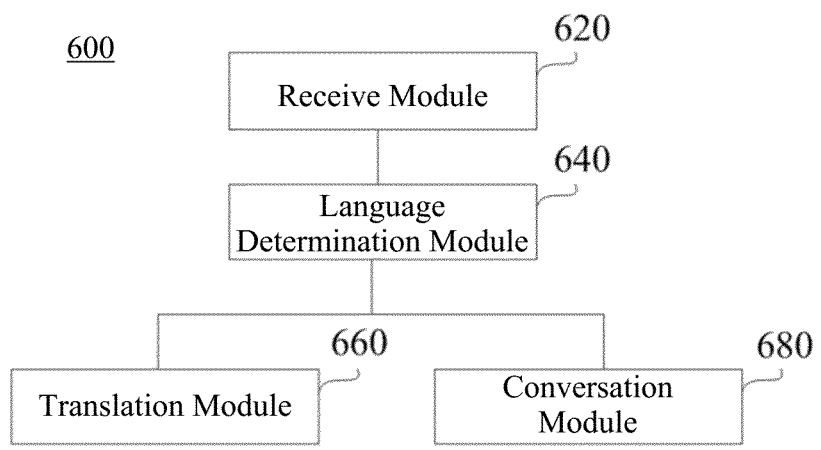
FIG. 6 is a block diagram of a server device configured to provide a language service in accordance with some embodiments.

FIG. 6 is a block diagram of a server device 600 configured to provide a language service in accordance with some embodiments. The service device 600 can be structurally and functionally similar to the server devices shown and described above with respect to FIGS. 1-5D. Similar to the server device 145 in FIG. 1, the server device 600 can be operatively coupled to (e.g., via a network similar to the network 155 in FIG. 1) and communicate with one or more client devices (e.g., the client device 125 in FIG. 1) to provide the language service to user(s) of the client device(s).

As shown in FIG. 6, the server device 600 includes a receive module 620, a language determination module 620, a translation module 660 and a conversation module 680. In some embodiments, each module included in the server device 600 can be a hardware-based module (e.g., a digital signal processor (DSP), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the server device 600 (not shown in FIG. 6) and executed at a processor (e.g., a CPU) of the server device 600 (not shown in FIG. 6).

The modules of the server device 600 (including the receive module 620, the language determination module 620, the translation module 660 and the conversation module 680) can be configured to collectively perform at least a portion of the methods 200, 400 and 500 in FIGS. 2, 4A and 5A. Specifically, the receive module 620 is configured to receive messages (e.g., speech message, textual message) from the client device. Additionally, the receive module 620 is configured to receive, from the client device, the information of the selected operational mode, information of selected configuration settings (e.g., selected first language and second language), an indication of a preset mode being activated, and/or other data and information. In some embodiments, the receive module 620 includes a mixture receive sub-module configured to receive a message mixed in more than one language. Such a mixture receive sub-module can be activated, for example, in response to an indication of a preset mode being activated.

The language determination module 640 is configured to determine the language(s) of a message (e.g., a speech message, a textual message) received at the receive module 620. In some embodiments, the language determination module 640 can be equipped with and/or accessible to resources (e.g., database) associated with certain languages that are selected as the first language and the second language. In some embodiments, as described above with respect to the method 200 in FIG. 2, the language determination module 640 is configured to determine the language(s) of a received message using any suitable speech recognition method, textual determination method, language identification method, and/or the like. Such a determination process can be based on any data or information of the received message and/or other resources such as, for example, an acoustic model associated with the first language or the second language, a regular expression of the received message, encoding information of the received message, a regular expression template of the first language or the second language, an encoding model for the first language or the second language, etc.

In some embodiments, the language determination module 640 includes, for example, a sub-module configured to calculate confidence values of speech messages based on acoustic models, another sub-module configured to determine the language of a speech message based on multiple confidence values calculated for that message, yet another sub-module configured to determine the language of textual messages based on regular expressions and/or encoding information of those textual messages, and/or the like.

The translation module 660 is configured to translate a received message (e.g., a speech message, a textual message) in a language to a message (e.g., a speech message, a textual message) in another language. Similar to the language determination module 640, the translation module 660 can be equipped with and/or accessible to resources (e.g., database) associated with certain languages that are selected as the first language and the second language. Furthermore, in some embodiments, the translation module 660 can include a first sub-module configured to translate a message in a first language to another message in a second language, and a second sub-module configured to translate a message in the second language to another message in the first language. In some embodiments, as described above with respect to the method 200 in FIG. 2, the translation module 600 is configured to translate a message in a language into another message in a different language using any suitable translation technique and/or message-transforming technique (e.g., a machine translation technique, a speech synthesis technique, a text-to-speech transform technique, etc.) based on the forms of the two messages.

In some embodiments, the translation module 660 includes, for example, a sub-module configured to translate a speech message to a speech message, a sub-module configured to translate a textual message to a speech message, a sub-module configured to translate a speech message to a textual message, a sub-module configured to translate a textual message to a textual message, and/or so forth.

Alternatively, in some embodiments, the translation module 660 includes, for example, a speech recognition sub-module for each language (i.e., configured to transform a speech message into a textual message in the same language), a machine translation sub-module for translating a textual message in the first language into a textual message in the second language, a machine translation sub-module for translating a textual message in the second language into a textual message in the first language, and a speech synthesis sub-module for each language (i.e., configured to generate a speech message based on a textual message in the same language), and/or the like.

The conversation module 680 is configured to generate a responding message (e.g., a speech message, a textual message) including a conversational response to a received message (e.g., a speech message, a textual message). Similar to the language determination module 640 and the translation module 660, the conversation module 680 can be equipped with and/or accessible to resources (e.g., database) associated with certain languages that are selected as the first language and the second language. As described above with respect to the method 200 in FIG. 2, the conversation module 680 is configured to generate the responding message using any suitable conversation technique and/or message-transforming technique (e.g., a man-machine interrogation technique, a speech synthesis technique, a text-to-speech transform technique, a speech-to-text transform technique, etc.) based on the forms of the received message and the responding message.

Figure 7:
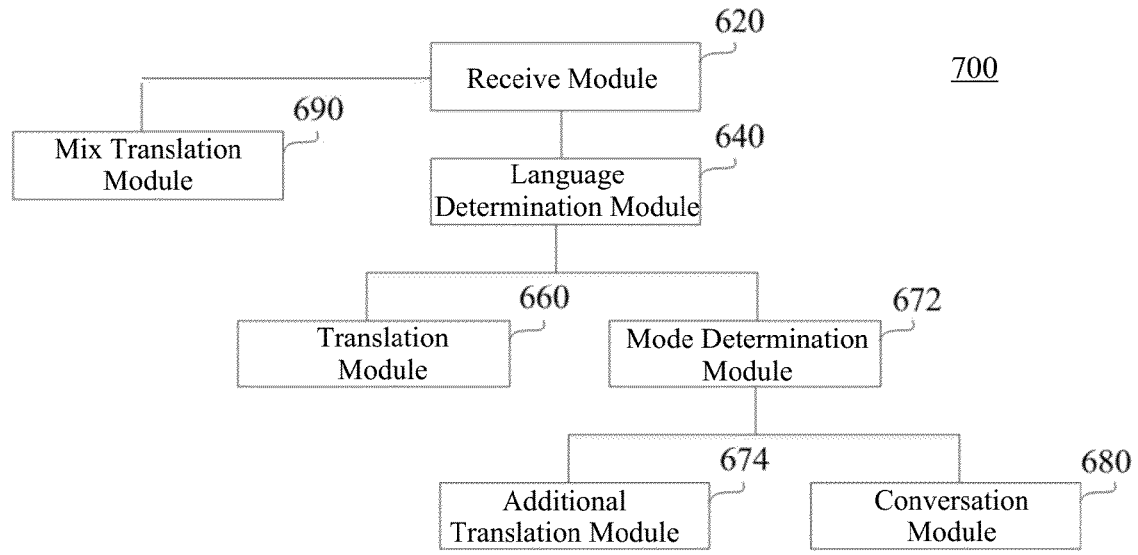
FIG. 7 is a block diagram of a server device configured to provide another language service in accordance with some embodiments.

FIG. 7 is a block diagram of a server device 700 configured to provide another language service in accordance with some embodiments. The service device 700 can be (substantially) identical, or structurally and functionally similar, to the server device 600 shown and described above with respect to FIG. 6. Similar to the server device 145 in FIG. 1, the server device 700 can be operatively coupled to (e.g., via a network similar to the network 155 in FIG. 1) and communicate with one or more client devices (e.g., the client device 125 in FIG. 1) to provide the language service to user(s) of the client device(s).

As shown in FIG. 7, the server device 700 includes the same (or substantially the same) modules of the server device 600 in FIG. 6: the receive module 620, the language determination module 620, the translation module 660 and the conversation module 680. Additionally, the server device 700 includes a mix translation module 690, a mode determination module 672 and an additional translation module 674. Similar to those modules included in the server device 600 in FIG. 6, each additional module included in the server device 700 can be a hardware-based module (e.g., a DSP, a FPGA, etc.), a software-based module (e.g., a module of computer code executed at a processor, a set of processor-readable instructions executed at a processor, etc.), or a combination of hardware and software modules. Instructions or code of each module included in the server device 700 can be stored in a memory of the server device 700 (not shown in FIG. 7) and executed at a processor (e.g., a CPU) of the server device 700 (not shown in FIG. 7).

The mix translation module 690 is configured to translate a message (e.g., a speech message, a textual message) mixed in more than one language into a message (e.g., a speech message, a textual message) in a target language. The mix translation module 690 can be similar to the translation module 660 as described above. The mode determination module 672 is configured to determine a current operational mode (e.g., a translation mode, a conversation mode). In some embodiments, the mode determination module 672 can determine the current operational mode based on, for example, an indication of a selected operational mode received from a client device.

The additional translation module 674 is configured to translate a message (e.g., a speech message, a textual message) in a language to a message (e.g., a speech message, a textual message) in another language. In some embodiments, the additional translation module 674 can be similar to the translation module 660 and/or the mix translation module 690. In some embodiments, the additional translation module 674, the translation module 660 and the mix translation module 690 can be configured to perform different functions. For example, the additional translation module 674 is configured to translate a message from a first language to a second language; the translation module 660 is configured to translate a message from the second language to the first language; and the mix translation module 690 is configured to translate a message mixed in the first language and the second language to the first language or the second language.

In the embodiments associated with FIG. 7, if the mode determination module 672 determines that the current mode is the conversation mode, the conversation module 680 can be activated to generate a conversational response to a received message. Otherwise, if the mode determination module 672 determines that the current mode is the translation mode, the additional translation module 674 can be activated to translate the received message.

Figure 8:
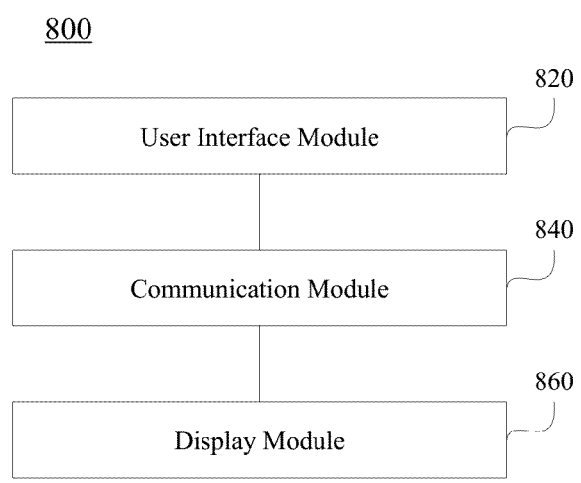
FIG. 8 is a block diagram of a client device configured to provide a language service in accordance with some embodiments.

FIG. 8 is a block diagram of a client device 800 configured to provide a language service in accordance with some embodiments. The client device 800 can be structurally and functionally similar to the client devices shown and described above with respect to FIGS. 1-5D. Similar to the client device 125 in FIG. 1, the client device 800 can be operatively coupled to (e.g., via a network similar to the network 155 in FIG. 1) and communicate with one or more server devices (e.g., the server device 145 in FIG. 1) to provide the language service to user(s) of the client device 800.

As shown in FIG. 8, the client device 800 includes a user interface module 820, a communication module 840 and a display module 860. In some embodiments, each module included in the client device 800 can be a hardware-based module (e.g., a DSP, a FPGA, etc.), a software-based module (e.g., a module of computer code executed at a processor, a set of processor-readable instructions executed at a processor, etc.), or a combination of hardware and software modules. Instructions or code of each module can be stored in a memory of the client device 800 (not shown in FIG. 8) and executed at a processor (e.g., a CPU) of the client device 800 (not shown in FIG. 8). In some embodiments, although not shown in FIG. 8, the client device 800 can include more components, devices and/or modules than those shown in FIG. 8. For example, the client device 800 can include a microphone, a speaker, a keyboard, and/or the like.

The modules of the client device 800 (including the user interface module 820, the communication module 840 and the display module 860) can be configured to collectively perform at least a portion of the methods 300, 400 and 500 in FIGS. 3, 4A and 5A. Specifically, the user interface module 820 is configured to present user interfaces on a display (e.g., a monitor, a screen, a touch screen) of the client device 800. Such user interfaces can include, for example, the user interfaces shown and described above with respect to FIGS. 4B-4G and 5B-5D. The communication module 840 is configured to send data to and/or receive data from the server device(s) communicating with the client device 800. Particularly, the communication module 840 is configured to send data to and/or receive data from other devices via, for example, a wired network, a wireless network, and/or a combination of wired and wireless networks. The display module 860 is configured to control and operate a display device (e.g., a monitor, a screen, a touch screen) of the client device 800. Particularly, the display module 860 is configured to display textual messages on various user interfaces on the display device, as shown and described above with respect to FIGS. 4B-4G and 5B-5D.

Figure 9:
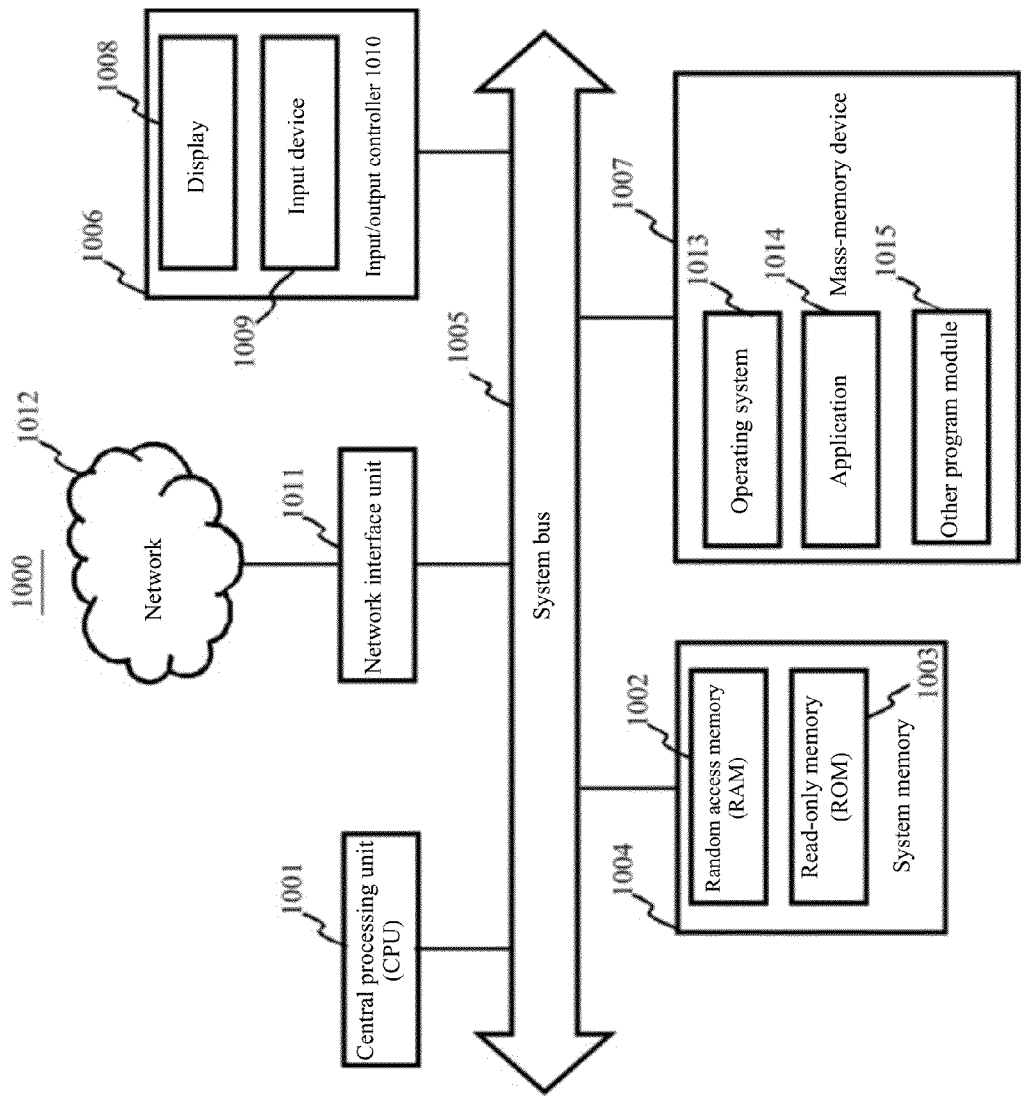
FIG. 9 is a block diagram illustrating structure of a server device in accordance with some embodiments.

FIG. 9 is a block diagram illustrating structure of a server device 1000 in accordance with some embodiments. The server device 1000 can be structurally and functionally similar to the server devices shown and described above with respect to FIGS. 1-8. The server device 1000 can be operatively coupled to (e.g., via a network 1012) and communicate with one or more client devices (e.g., the client device 125 in FIG. 1) to provide a language service to user(s) of the client device(s). As shown in FIG. 9, the server device 1000 includes a processor 1001, a system memory 1004, a system bus 1005, a network interface unit 1011, a mass-memory device 1007, and an input/output controller 1010. In some embodiments, the server device 1000 can include more or less devices, components and/or modules than those shown in FIG. 9.

The processor 1001 can be any processing device capable of performing at least a portion of methods for providing language services described herein. Such a processor can be, for example, a CPU, a DSP, a FPGA, and/or the like. The processor 1001 can be configured to control the operations of other components and/or modules of the server device 1000. For example, the processor 1001 can be configured to control operations of the network interface unit 1011. For another example, the processor 1001 can be configured to execute instructions or code stored in a software program or module (e.g., an operating system 1013, an application 1014, and other program module 1015) within the mass-memory device 1007. In some embodiments, the processor 1001 can include one or more processing cores.

The system bus 1005 is configured to implement connections and communication among the other components of the server device 1000. The network interface unit 1011 is configured to provide and control network interfaces of the server device 1000 that are used to interact with other network devices (e.g., client devices). The network interface unit 1011 can include, for example, a standard wired interface and a standard wireless interface (e.g., a Wi-Fi interface). In some embodiments, the network interface unit 1011 is used for connecting one or more client devices and performing data communication with the one or more client devices. In some embodiments, as shown in FIG. 9, the network interface unit 1011 is configured to connect the server device 1000 to the network 1012, which can be similar to the network 155 shown and described above with respect to FIG. 1. In some embodiments, operations of network interface unit 1011 are controlled by instructions or code stored in the operating system 1013 in the mass-memory device 1007.

In some embodiments, the server device 1000 can also be run in a remote computer connected via a network such as, for example, the Internet. For example, the server device 1000 can be connected to the network 1012, and/or any type of remote computer system, through the network interface unit 1011.

The input/output controller 1006 is configured to provide and control input/output interfaces that are used to interact with client devices and/or an operator of the server device 1000. Such input/output interfaces can include, for example, a display 1008 (e.g., a monitor, a screen), an input device 1009 (e.g., a keyboard, a mouse), and other input/output devices (e.g., a printer, a speaker, a light, an alarm, etc.). In some embodiments, operations of the input/output controller 1010 are controlled by instructions or code stored in the operating system 1013 in the mass-memory device 1007.

The system memory 1004 can include, for example, a random-access memory (RAM) 1002 (e.g., a DRAM, a SRAM, a DDR RAM, etc.), a read-only memory (ROM) 1003, a non-volatile memory such as one or more magnetic disk storage devices, optical disk storage devices, flash memory devices, or other non-volatile solid state storage devices. In some embodiments, the system memory 1004 can include one or more storage devices (e.g., a removable memory) remotely located from other components of the server device 1000.

The mass-memory device 1007 can be structurally similar to the system memory 1003. The mass-memory device 1007 can be any type of memory device (e.g., flash memory device, removable memory device, magnetic disk storage device, optical disk storage device, etc.) configured to store modules, programs, applications of the server device 1000. In some embodiments, the mass-memory device 1007 can include computer readable mediums such as, for example, a hard disk or CD-ROM driver. As shown in FIG. 9, the mass-memory device 1007 includes at least the operating system 1013, the application 1014 and other program module 1015.

Without loss of generality, the mentioned computer readable medium can include computer memory medium and communication medium. The computer memory medium includes volatile and non-volatile, mobile and immobile mediums realized by any method or technology which is configured to store information such as computer readable instruction, data structure, program module or other data. The computer memory medium includes RAM, ROM, EPROM, EEPROM, flash memory or other solid-state storage technologies, CD-ROM, DVD or other optical storages, cassette, magnetic tape, magnetic disk memory or other magnetic memory devices. In some embodiments, the system memory 1004 and the mass-memory unit 1007 can be collectively referred to as memory of the server device 1000.

In some embodiments, each component, program, application or module included in the mass-memory device 1007 can be a hardware-based module (e.g., a DSP, a FPGA), a software-based module (e.g., a module of computer code executed at a processor, a set of processor-readable instructions executed at a processor), or a combination of hardware and software modules. Instructions or code of each component, program, application or module can be stored in the mass-memory device 1007 and executed at the processor 1001. In some embodiments, the mass-memory device 1007 can include more or less components, programs, applications or modules than those shown in FIG. 9.

In some embodiments, the server device 1000 is configured to perform at least a portion of the methods 200, 400 and 500 shown and described above with respect to FIGS. 2, 4A and 5A. In such embodiments, for example, the server device 1000 communicates with a client device (similar to the client devices described above with respect to FIGS. 1-8) to provide a language service to a user of the client device. The application 1014 can be a server-side portion of an application associated with providing the language service. Thus, the application 1014, when executed by the processor 1001, is configured to perform at least a portion (the server-side portion) of the above-described methods to provide the language service to the user of the client device, as shown and described above with respect to FIGS. 1-8.

Figure 10:
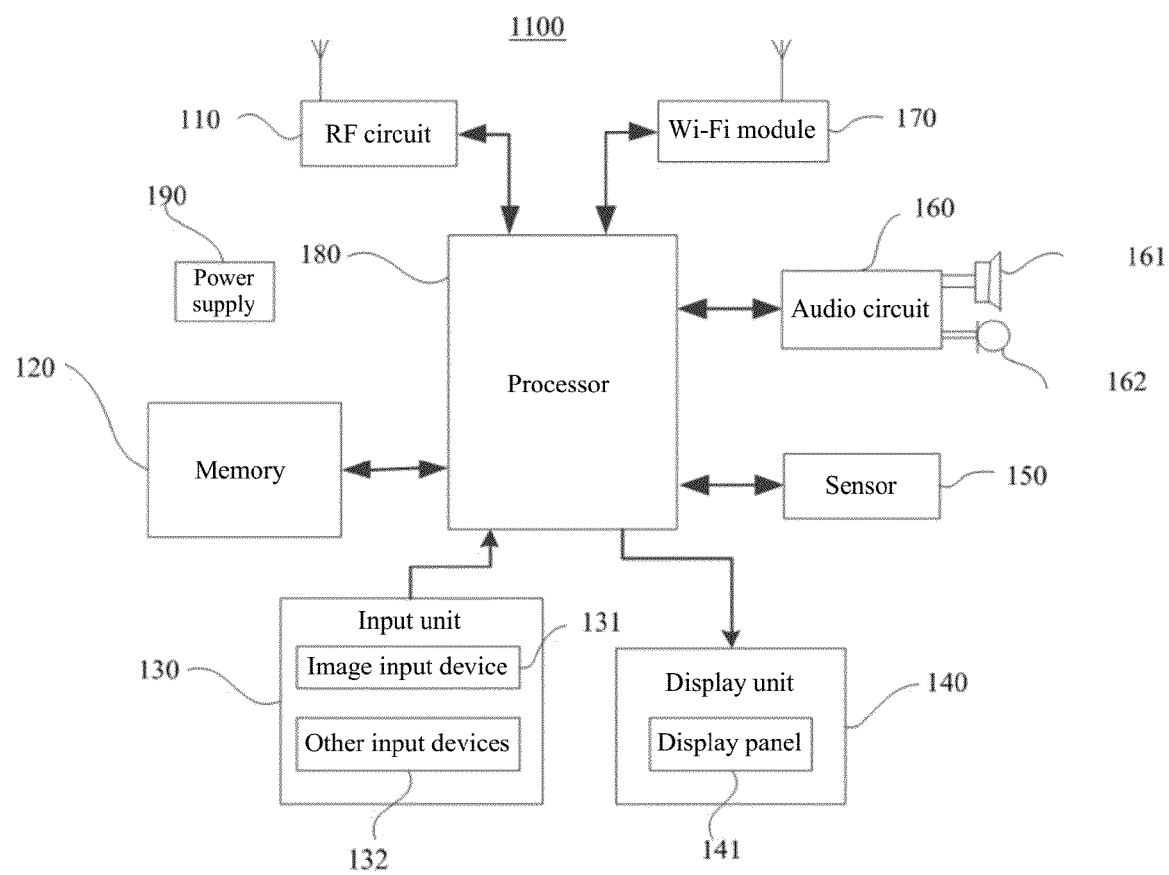
FIG. 10 is a block diagram illustrating structure of a client device in accordance with some embodiments.

FIG. 10 is a block diagram illustrating structure of a client device 1100 in accordance with some embodiments. The client device 1100 can be structurally and functionally similar to the client devices shown and described above with respect to FIGS. 1-8. The client device 1100 can be operatively coupled to (e.g., via a network similar to the network 155 in FIG. 1) and communicate with one or more server devices (e.g., the server device 145 in FIG. 1) to provide a language service to user(s) of the client device 1100. As shown in FIG. 10, the client device 1100 includes a processor 180, a memory 120, an input unit 130, a display unit 140, a sensor 150, an audio circuit 160, a Wi-Fi (Wireless Fidelity) module 170, a radio frequency (RF) circuit 110 and a power supply 190. In some embodiments, the client device 1100 can include more or less devices, components and/or modules than those shown in FIG. 10. One skilled in the art understands that the structure of the client device 1100 shown in FIG. 10 does not constitute a limitation for the client device 1100, and may include more or less components than those illustrated in FIG. 10. Furthermore, the components of the client device 1100 (shown or not shown in FIG. 10) can be combined and/or arranged in different ways other than that shown in FIG. 10.

The RF circuit 110 is configured to send and receive data, and in particular, to send uplink to data to and/or receive downlink data from a base station (e.g., a server device). The RF circuit 110 is configured to send the received data to the processor 180 for further processing. The RF circuit 110 can include, for example, one more antenna, amplifier, tuner, oscillator, subscriber identity module (SIM) card, transceiver, coupler, low noise amplifier (LNA), duplexer, etc. The RF circuit 110 is configured to wirelessly communicate with other network or device using any suitable wireless communication protocol such as, for example, GSM, GPRS, CDMA, WCDMA, LTE, etc.

The memory 120 is configured to store software programs and/or modules. The processor 180 can execute various applications and data processing functions included in the software programs and/or modules stored in the memory 120. The memory 120 includes, for example, a program storage area and a data storage area. The program storage area is configured to store, for example, an operating system and application programs. The data storage area is configured to store data received and/or generated during the use of the client device 1100 (e.g., speech messages, textual messages). The memory 120 can include one or more high-speed RAM, non-volatile memory such as a disk storage device and a flash memory device, and/or other volatile solid state memory devices. In some embodiments, the memory 120 also includes a memory controller configured to provide the processor 180 and the input unit 130 with access to the memory 120.

The input unit 130 is configured to receive input data and signals (e.g., messages) and also generate signals caused by operations and manipulations of input devices such as, for example, a user's finger, a touch pen, a keyboard, a mouse, etc. Specifically, the input unit 130 includes an image input device 131 (e.g., a touch screen, a touchpad) and other input devices 132. The image input device 131 is configured to collect touch operations on or near the image input device 131 that are performed by a user of the client device 1100, such as operations performed by the user using a finger, stylus, touch pen, or any other suitable object or attachment on or near a touch-sensitive surface of the image input device 131. In some embodiments, the image input device 131 can optionally include a touch detection apparatus and a touch controller. The touch detection apparatus can detect the direction of the touch operation and signals generated by the touch operation, and then transmit the signals to the touch controller. The touch controller can receive the signals from the touch detection apparatus, convert the signals into contact coordinate data, and then send the contact coordinate data to the processor 180. The touch controller can also receive and execute commands received from the processor 180. The image input device 131 can be implemented using various types of technologies such as, for example, resistive touch screen, capacitive touch screen, infrared ray touch screen, surface acoustic wave (SAW) touch screen, etc. The other input devices 132 can include, for example, a physical keyboard, a function key (such as a volume control key, a switch key, etc.), a trackball, a mouse, a joystick, etc.

The display unit 140 is configured to display information (e.g., textual messages) entered by the user and/or received from the server device on various graphical user interfaces (GUIs) of the client device 1100. The GUIs can include, for example, graph, text, icon, video, and/or any combination of them. The display unit 140 includes a display panel 141, which can be, for example, a LCD, a LED, organic light-emitting diode (OLED) display, etc. Furthermore, the image input device 131 can cover the display panel 141. After a touch operation on or near the image input device 131 is detected, the image input device 131 transmits information of the touch operation to the processor 180, where the type and/or other information of the touch operation are determined. The processor 180 sends visual information to the display panel 141 based on the determined type of the touch operation. The visual information is then displayed on the display panel 141. Although shown in FIG. 10 as two separate components for the input and output functions respectively, in other embodiments, the image input device 131 and the display panel 141 can be integrated into one component for realization of the input and output functions.

The client device 1100 includes at least one sensor 150 such as, for example, a light sensor, a motion sensor, and/or other types of sensors. A light sensor can be, for example, an ambient light sensor or a proximity sensor. The ambient light sensor is configured to adjust the brightness of the display panel 141 according to the light intensity received at the ambient light sensor. The proximity sensor is configured to turn off the display panel 141 and/or backlight when, for example, the client device 1100 moves near the user's ear. A motion sensor can be, for example, an acceleration transducer that can measure acceleration at each direction (e.g., 3-axis directions), measure the magnitude and direction of gravity when stationary, be used in applications for recognition of the posture of the client device 1100 (e.g., horizontal and vertical screen switching, games, magnetometer posture calibration), be used in applications related to vibration recognition (e.g., pedometer, percussion), and/or the like. Additionally, although not shown in FIG. 10, the client device 1100 can also include other sensory devices such as, for example, a gyroscope, a barometer, a hygrometer, a thermometer, an infrared sensor, and/or the like.

The audio circuit 160, the speaker 161 and the microphone 162 collectively provide an audio interface between the user and the client device 1100. The audio circuit 160 transmits an electric signal converted from audio data to the speaker 161, where the electric signal is converted and output as an acoustical signal by the speaker 161. The microphone 162 converts a collected acoustical signal into an electric signal, which is then sent to and converted to audio data by the audio circuit 160. The audio data is sent to the processor 180 for further processing, and then sent to another terminal device through the RF circuit 110 or stored in the memory 120 for further processing. The audio circuit 160 can also include an earplug jack to enable communication between a peripheral headset and the client device 1100. In some embodiments, a speech message spoken by the user can be received through the microphone 162 and the audio circuit 160. Similarly, a speech message received from the server device can be played using the speaker 161 and the audio circuit 160.

The Wi-Fi module 170 is configured to enable Wi-Fi communication between the client device 1100 and other devices or network. For example, the Wi-Fi module 170 provides the user with a wireless access to broadband Internet. As a result, the user can use the Wi-Fi connection to, for example, send and receive E-mails, browse web pages, access streaming media, and so on. Although shown in FIG. 10 as including the Wi-Fi module 170, in some other embodiments, a client device can operate without such a Wi-Fi module or the Wi-Fi functionality.

The processor 180 functions as a control center of the client device 1100. The processor 180 is configured to operatively connect each component of the client device 1100 using various interfaces and circuits. The processor 180 is configured to execute the various functions of the client device 1100 and to perform data processing by operating and/or executing the software programs and/or modules stored in the memory 120 and using the data stored in the memory 120. In some embodiments, the processor 180 can include one or more processing cores. In some embodiments, an application processor and a modem processor can be integrated at the processor 180. The application processor is configured to monitor and control the operating system, user interfaces, application programs, and so on. The modem processor is configured to control wireless communication.

The power supply 190 is used to provide power for the various components of the client device 1100. The power supply 190 can be, for example, a battery. The power supply 190 can be operatively coupled to the processor 180 via a power management system that controls charging, discharging, power consumption, and/or other functions related to power management. In some embodiments, the power supply 190 can include one or more DC and/or AC power source, recharging system, power failure detection circuit, power converter or inverter, power supply status indicator, and/or the like.

While shown and described herein as a system (e.g., the system 100 in FIG. 1) providing a language service associated with two languages (e.g., a first language and a second language), in some embodiments, a similar system can be configured to provide a language service associated with more than two languages. Such a system can use devices similar to the devices (e.g., client devices, server devices) described herein to perform methods similar to the methods described herein (e.g., the methods 200, 400, 500) using identical or similar techniques. For example, a system can provide a language service that an input message (e.g., a speech message, a textual message) in a first language (e.g., Chinese) can be translated into a message (e.g., a speech message, a textual message) in a second language (e.g., French) and another message (e.g., a speech message, a textual message) in a third language (e.g., Spanish). For another example, a system can provide a language service that an initiating message (e.g., a speech message, a textual message) in a language (e.g., English) can be responded by a conversational response (e.g., a speech message, a textual message) in the same language and another conversational response (e.g., a speech message, a textual message) in another language (e.g., French).

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method, comprising:

at a computer system having one or more processors and memory for storing programs to be executed by the one or more processors:

receiving a first message from a client device;

determining if the first message is in a first language or a second language, the second language being different than the first language;

if the first message is in the first language, translating the first message into a second message in the second language;

if the first message is in the second language, generating a third message in the second language, the third message including a conversational response to the first message; and returning one of the second message and the third message to the client device, wherein the first message is a speech message, the second message is a speech message, the translating further including:

generating, based on the first message, a fourth message using a speech recognition system for the first language, the fourth message being a textual message in the first language and a speech-to-text transform of the first message;

translating the fourth message into a fifth message using machine translation, the fifth message being a textual message in the second language; and generating, based on the fifth message, the second message using speech synthesis, the second message being a text-to-speech transform of the fifth message.

2. The method of claim 1, wherein the first message is a speech message, the determining includes:

calculating a first confidence value for the first message based on an acoustic model associated with the first language;

calculating a second confidence value for the first message based on an acoustic model associated with the second language; and determining if the first message is in the first language or the second language based on a comparison of the first confidence value and the second confidence value.

3. The method of claim 1, wherein the first message is a speech message, the third message is a speech message, the generating the third message includes:

generating, based on the first message, a fourth message using a speech recognition system for the second language, the fourth message being a textual message in the second language and a speech-to-text transform of the first message;

generating, based on the fourth message, a fifth message using man-machine interrogation, the fifth message being a textual message in the second language and a conversational response to the fourth message; and generating, based on the fifth message, the third message using speech synthesis, the third message being a text-to-speech transform of the fifth message.

4. A server device, comprising:

one or more processors; and memory storing one or more programs to be executed by the one or more processors, the one or more programs comprising instructions for:

receiving an indication of an operational mode from a client device, the operational mode being a conversation mode or a translation mode;

receiving a first message from the client device;

determining if the first message is in a first language or a second language, the second language being different than the first language;

if the first message is in the second language and the operational mode is the conversation mode, generating a second message in the second language, the second message including a conversational response to the first message;

if the first message is in the second language and the operational mode is the translation mode, translating the first message into a third message in the first language; and returning one of the second message and the third message to the client device if the first message is in the second language, wherein the first message is a speech message, the second message is a speech message, the translating further including:

generating, based on the first message, a fourth message using a speech recognition system for the first language, the fourth message being a textual message in the first language and a speech-to-text transform of the first message;

translating the fourth message into a fifth message using machine translation, the fifth message being a textual message in the second language; and generating, based on the fifth message, the second message using speech synthesis, the second message being a text-to-speech transform of the fifth message.

5. The server device of claim 4, wherein the one or more programs further comprise instructions for:

if the first message is in the first language and the operational mode is the conversation mode, generating a fourth message in the second language, the fourth message including a conversational response to the first message;

if the first message is in the first language and the operational mode is the translation mode, translating the first message into a fifth message in the second language; and returning one of the fourth message and the fifth message to the client device if the first message is in the first language.

6. The server device of claim 4, wherein the first message is a speech message in the second language, the third message is a textual message in the first language, the translating the first message into the third message includes:

generating, based on the first message, a fourth message using a speech recognition system for the second language, the fourth message being a textual message in the second language and a speech-to-text transform of the first message; and translating the fourth message into the third message using machine translation.

7. The server device of claim 4, wherein receiving the first message includes receiving the first message from the client device via a wireless network.

8. A non-transitory computer readable storage medium storing one or more programs, the one or more programs comprising instructions, which, when executed by one or more processors, cause the processors to perform operations comprising:

receiving a first message from a client device;

determining that the first message includes a first portion in a first language and a second portion in a second language, the second language being different than the first language;

translating the first message into a second message in the second language; and returning the second message to the client device, wherein the first message is a speech message, the second message is a speech message, the translating further including:

generating, based on the first message, a third message using a bilingual speech recognition system for the first language and the second language, the third message being a textual message including a first portion in the first language and a second portion in the second language, the third message being a speech-to-text transform of the first message;

translating the third message into a fourth message using machine translation, the fourth message being a textual message in the second language; and generating, based on the fourth message, the second message using speech synthesis, the second message being a text-to-speech transform of the fourth message.

9. The non-transitory computer readable storage medium of claim 8, wherein the one or more programs further comprise instructions for:

receiving an indication of an operational mode from the client device prior to receiving the first message, the operational mode being a conversation mode or a translation mode;

if the operational mode is the translation mode, translating the first message into the second message and returning the second message to the client device; and if the operational mode is the conversation mode, generating a third message in the second language and returning the third message to the client device, the third message including a conversational response to the first message.

10. The non-transitory computer readable storage medium of claim 8, wherein the first message is a speech message, the determining includes determining the first portion based on an acoustic model associated with the first language and determining the second portion based on an acoustic model associated with the second language.

* * * * *